(12) United States Patent
Motil

(10) Patent No.: US 12,737,019 B2
(45) Date of Patent: Sep. 15, 2026

(54) INITIATING RECOVERY OF AN ELECTRONIC DEVICE USING A POWER RESET PATTERN

(71) Applicant: Microsoft Technology Licensing, LLC, Redmond, WA (US)

(72) Inventor: Kirill Motil, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 18/961,359

(22) Filed: Nov. 26, 2024

(65) Prior Publication Data

US 2026/0147394 A1 May 28, 2026

(51) Int. Cl.
*G06F 1/24* (2006.01)
*G06F 1/28* (2006.01)

(52) U.S. Cl.
CPC . *G06F 1/24* (2013.01); *G06F 1/28* (2013.01)

(58) Field of Classification Search
None
See application file for complete search history.

(56) References Cited

U.S. PATENT DOCUMENTS 5,345,583 A * 9/1994 Davis .................. G06F 11/0757 714/E11.003
12,405,871 B2 * 9/2025 Peng ....................... H04L 12/10
2009/0204837 A1 * 8/2009 Raval .................... G06F 1/3203 713/330
2012/0166783 A1 6/2012 Kamdar
2020/0057485 A1 * 2/2020 Chiang ..................... G06F 1/28
2021/0014110 A1 1/2021 Comerica

FOREIGN PATENT DOCUMENTS

KR 20190047245 A 5/2019

OTHER PUBLICATIONS

Extended European search report received in European Application No. 25216181.5, mailed on Apr. 1, 2026, 14 pages.

* cited by examiner

*Primary Examiner* — Cassandra F Cox
(74) *Attorney, Agent, or Firm* — Wade IP Law PLLC

(57) ABSTRACT

Techniques are described herein that are capable of initiating recovery of an electronic device using a power reset pattern. In a first example implementation, a determination is made that an electronic device is in a non-operational state. A power supply control signal is generated. The electronic device is caused to initiate a recovery process using a power reset pattern by providing the power supply control signal to the power supply via a power line. The recovery process changes the electronic device from the non-operational state to an operational state. In a second example implementation, a power reset pattern is received via a power line from a power supply. A determination is made that the power reset pattern is an instruction to initiate a recovery process. An electronic device is changed from a non-operational state to an operational state by initiating the recovery process.

20 Claims, 9 Drawing Sheets

INITIATING RECOVERY OF AN ELECTRONIC DEVICE USING A POWER RESET PATTERN

BACKGROUND

When an electronic device is non-operational, it often is desirable to perform an action that causes the electronic device to become operational. Causing an electronic device to become operational is referred to as "recovering" the electronic device. One technique for recovering an electronic device involves accessing the electronic device remotely via a communication channel to correct the issue that causes the electronic device to be non-operational. However, the issue may prevent access to the electronic device via the communication channel. In such instances, the electronic device may be accessed manually onsite. However, accessing an electronic device manually onsite typically consumes a substantial amount of time and resources. For example, the electronic device may be in a location that is relatively difficult to access (e.g., underwater, in space, or in a desert). In another example, the issue may cause multiple electronic devices (e.g., hundreds of thousands or millions) to become inaccessible remotely via the communication channel, and accessing the electronic devices manually one-at-a-time onsite may take days, weeks, or months.

SUMMARY

Recovery of an electronic device is a conversion of the electronic device from a non-operational state to an operational state. A non-operational state of an electronic device is a state in which the electronic device is not capable of performing an intended task (e.g., not capable of functioning). An intended task of an electronic device is a task that the electronic device was configured to perform. It will be recognized that the electronic device may have been reconfigured since the electronic device was configured to perform the task. Such reconfiguration may cause the electronic device to be in a non-operational state as a result of the reconfiguration rendering the electronic device unable to perform the task that the electronic device was previously configured to perform. An operational state of an electronic device is a state in which the electronic device is capable of performing an intended task (e.g., capable of functioning). A recovery process is a process that is configured to convert an electronic device from a non-operational state to an operational state.

It may be desirable to initiate recovery of an electronic device using electricity over a power line. For instance, the electronic device may be recovered using a power reset pattern that is transmitted to the electronic device over the power line. By using the power reset pattern, the electronic device may be recovered even if the electronic device is inaccessible via a communication channel that traditionally is used for such purpose. A power reset pattern is a pattern that is defined by power pulses (e.g., a sequence of power pulses) having respective durations to indicate that a recovery process is to be initiated. The durations and the order of the power pulses may represent a code that indicates that the recovery process is to be initiated. In an aspect, the code indicates a type of recovery process that is to be performed to recover the electronic device and/or a type of electronic device that is to perform the recovery process. For example, a power reset pattern that includes a temporally first power pulse having a duration of 20 seconds and a temporally second power pulse having a duration of 50 seconds may represent a code of "25." The code "25" may trigger one or more electronic devices (e.g., a single electronic device that is uniquely identified by the code, electronic devices of a particular type that corresponds to the code, or all electronic devices that receive the power reset pattern) to initiate a recovery process (e.g., a particular type of recovery process that corresponds to the code).

Various approaches are described herein for, among other things, initiating recovery of an electronic device using a power reset pattern. A first example approach is implemented by a computing system. In the first example approach, a determination is made that an electronic device is in a non-operational state. A power supply control signal is generated. The power supply control signal is configured to control timing of on states and off states of a power supply associated with the electronic device in a manner that results in power pulses having respective durations. The electronic device is caused to initiate a recovery process using a power reset pattern by providing the power supply control signal to the power supply via a power line. The power reset pattern is defined by the power pulses having the respective durations. The recovery process changes the electronic device from the non-operational state to an operational state.

A second example approach is implemented by an electronic device. In the second example approach, a power reset pattern is received via a power line from a power supply associated with the electronic device. The power reset pattern is defined by power pulses having respective durations. A determination is made that the power reset pattern is an instruction to initiate a recovery process. The recovery process is configured to change the electronic device from a non-operational state to an operational state. The electronic device is changed from the non-operational state to the operational state by initiating the recovery process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
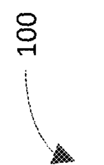
FIGS. 1-2 are block diagrams of example power reset pattern-based recovery systems in accordance with embodiments.
Figure 1:
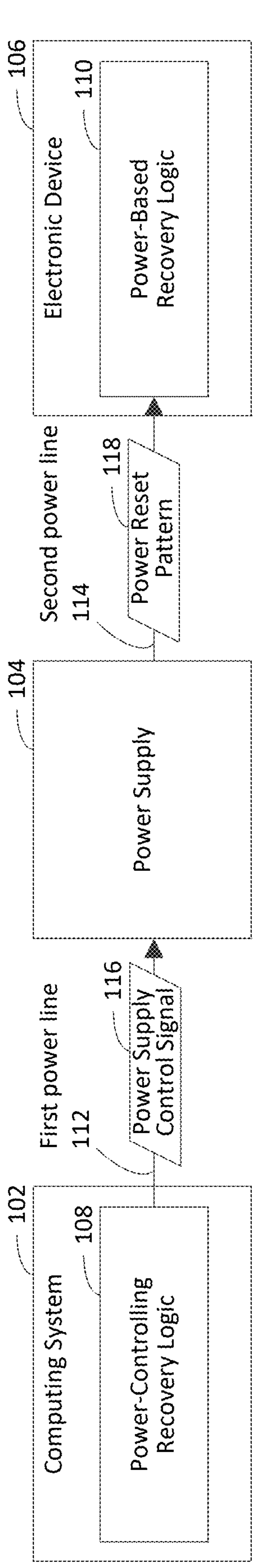

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

Recovery of an electronic device is a conversion of the electronic device from a non-operational state to an operational state. A non-operational state of an electronic device is a state in which the electronic device is not capable of performing an intended task (e.g., not capable of functioning). An intended task of an electronic device is a task that the electronic device was configured to perform. It will be recognized that the electronic device may have been reconfigured since the electronic device was configured to perform the task. Such reconfiguration may cause the electronic device to be in a non-operational state as a result of the reconfiguration rendering the electronic device unable to perform the task that the electronic device was previously configured to perform. An operational state of an electronic device is a state in which the electronic device is capable of performing an intended task (e.g., capable of functioning). A recovery process is a process that is configured to convert an electronic device from a non-operational state to an operational state.

It may be desirable to initiate recovery of an electronic device using electricity over a power line. A power line is a physical transmission medium via which power is supplied to a system (e.g., an electronic device or a power supply associated with the electronic device) by connecting the system to an energy source. It will be recognized that a power supply is one example type of an energy source. For instance, the electronic device may be recovered using a power reset pattern that is transmitted to the electronic device over the power line. By using the power reset pattern, the electronic device may be recovered even if the electronic device is inaccessible via a communication channel that traditionally is used for such purpose. A power reset pattern is a pattern that is defined by power pulses (e.g., a sequence of power pulses) having respective durations to indicate that a recovery process is to be initiated. The durations and the order of the power pulses may represent a code that indicates that the recovery process is to be initiated. In an aspect, the code indicates a type of recovery process that is to be performed to recover the electronic device and/or a type of electronic device that is to perform the recovery process. For example, a power reset pattern that includes a temporally first power pulse having a duration of 20 seconds and a temporally second power pulse having a duration of 50 seconds may represent a code of "25." The code "25" may trigger one or more electronic devices (e.g., a single electronic device that is uniquely identified by the code, electronic devices of a particular type that corresponds to the code, or all electronic devices that receive the power reset pattern) to initiate a recovery process (e.g., a particular type of recovery process that corresponds to the code).

Example embodiments described herein are capable of initiating recovery of an electronic device using a power reset pattern. A first example approach is implemented by a computing system. In the first example approach, a determination is made that an electronic device is in a non-operational state. A power supply control signal is generated. The power supply control signal is configured to control timing of on states and off states of a power supply associated with the electronic device in a manner that results in power pulses having respective durations. The electronic device is caused to initiate a recovery process using a power reset pattern by providing the power supply control signal to the power supply via a power line. The power reset pattern is defined by the power pulses having the respective durations. The recovery process changes the electronic device from the non-operational state to an operational state.

A second example approach is implemented by an electronic device. In the second example approach, a power reset pattern is received via a power line from a power supply associated with the electronic device. The power reset pattern is defined by power pulses having respective durations. A determination is made that the power reset pattern is an instruction to initiate a recovery process. The recovery process is configured to change the electronic device from a non-operational state to an operational state. The electronic device is changed from the non-operational state to the operational state by initiating the recovery process.

Example techniques described herein have a variety of benefits as compared to conventional techniques for recovering an electronic device. For instance, the example techniques are capable of recovering the electronic device even if the electronic device is inaccessible via a communication channel that is configured to enable recovery of the electronic device. The example techniques enable recovery of particular electronic devices by configuring the electronic devices to initiate recovery in response to receipt of a particular power reset pattern. For instance, electronic device(s) of a first type may be recovered using a first power reset pattern; electronic device(s) of a second type may be recovered using a second power reset pattern that is different form the first power reset pattern; electronic devices of a third type may be recovered using a third power reset pattern that is different from the first and second power reset patterns, and so on. The example techniques enable recovery of electronic device(s) using a particular type of recovery process by configuring the electronic device(s) to initiate the particular type of recovery process in response to receipt of a particular power reset pattern. For instance, electronic device(s) may be configured to initiate a first type of recovery process in response to a first power reset pattern; the electronic device(s) may be configured to initiate a second type of recovery process in response to a second power reset pattern that is different from the first power reset pattern; the electronic device(s) may be configured to initiate a third type of recovery process in response to a third power reset pattern that is different from the first and second power reset patterns, and so on.

The example techniques may enable recovery of an electronic device without a need to perform actions manually onsite. The example techniques enable recovery of the electronic device using existing power infrastructure. For instance, the example techniques may enable the recovery without a need to add a parallel signal infrastructure (e.g., a network) for sending a recovery signal to the electronic device. An electronic device may be modified to detect a power reset pattern (and to initiate a recovery process as a result) in accordance with any of the example techniques described herein relatively inexpensively. For instance, the electronic device may be modified by incorporating code (e.g., software or firmware) that is configured to implement (e.g., perform) the example techniques into the electronic device (e.g., into a non-volatile memory of the electronic device). The example techniques may enable recovery of an electronic device more quickly and/or efficiently than conventional techniques for recovering an electronic device. The example techniques may enable recovery of an electronic device at a lower cost than the conventional techniques (e.g., by obviating a need to maintain a large pool of personnel for emergencies only and/or by obviating a need to add a parallel signal infrastructure for transmission of a recovery signal to the electronic device).

The example techniques are capable of improving the functioning of an electronic device by enabling the electronic device to be recovered (e.g., even if the electronic device is inaccessible via a communication channel that is intended to enable recovery of the electronic device). The functioning of the electronic device may be improved in any of a variety of ways, including but not limited to restoring data integrity, repairing a configuration, resolving a fault, optimizing performance, and increasing security of the electronic device. For example, integrity of data that is stored by or otherwise accessible to the electronic device may be increased by restoring lost or corrupted data from a backup source, which may increase performance and/or reliability of the electronic device. In another example, a configuration setting of the electronic device may be changed, which may increase performance, security, and/or reliability of the electronic device. In yet another example, a software glitch, a firmware glitch, or a hardware failure may be identified and fixed, which may increase performance, security, and/or reliability of the electronic device. In still another example, updating firmware of the electronic device, applying a patch to software of the electronic device, and/or optimizing system resource(s) that are included in or accessible to the electronic device may increase performance (e.g., speed and/or efficiency) of the electronic device. In yet another example, updating security protocol(s) or protection(s) of the electronic device may increase security of the electronic device (e.g., by making the electronic device less vulnerable to attacks and/or ensuring that the electronic device operates within secure parameters).

The example techniques may reduce an amount of time and/or resources (e.g., processor cycles, memory, network bandwidth) that is consumed to recover an electronic device. For example, by causing the electronic device to initiate a recovery process, which changes the electronic device from a non-operational state to an operational state, using a power reset pattern by providing the power supply control signal to the power supply via a power line, the example techniques may reduce the amount of time and/or resources that otherwise would have been consumed (e.g., by a computing system) to recover the electronic device. In another example, the electronic device receiving the power reset pattern via a power line from the power supply and, in response, changing itself from the non-operational state to the operational state by initiating the recovery process reduces the amount of time and/or resources that otherwise would have been consumed to recover the electronic device. The example techniques may automate recovery of an electronic device using a power reset pattern. By reducing the amount of time and/or resources that is consumed by a computing system and/or an electronic device to recover the electronic device, the efficiency of the computing system and/or the electronic device may be increased.

By reducing the amount of time that is consumed to recover an electronic device, the example techniques may increase a user experience and/or efficiency of a managing entity (e.g., an information technology (IT) professional, such as a system administrator) who manages a system that includes the electronic device and/or an end user who uses the electronic device. The example techniques may reduce a number of tasks that are manually performed by the managing entity and/or the end user by automating recovery of the electronic device. Reducing the number of tasks that are manually performed by the managing entity may enable the managing entity to focus on other tasks, which may increase performance and/or security of the system that includes the electronic device. The user experience and/or efficiency of the managing entity and/or the end user may be increased in other ways, as well. For example, the user experience and/or the efficiency may be increased by increasing the performance, reliability, and/or security of the electronic device.

FIG. 1 is a block diagram of an example power reset pattern-based recovery system 100 in accordance with an embodiment. As shown in FIG. 1, the power reset pattern-based recovery system 100 includes a computing system 102, a power supply 104, and an electronic device 106. The computing system 102 is coupled (e.g., connected) to the power supply 104 via a first power line 112. In an aspect, the computing system 102 is physically coupled to the power supply 104 and electrically coupled to the power supply 104. The power supply is coupled to the electronic device 106 via a second power line 114. In an aspect, the power supply 104 is physically coupled to the electronic device 106 and electrically coupled to the electronic device 106. The power supply 104 is associated with the electronic device 106.

A computing system (e.g., computing system 102) is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. Examples of a computing system include but are not limited to a computer, a personal digital assistant, a cellular telephone, a game console, and an Internet of things (IoT) device. Examples of a computer include but are not limited to a server computer, a desktop computer, a laptop computer, a tablet computer, and a wearable computer (e.g., a smart watch or a head-mounted computer).

The computing system 102 includes power-controlling recovery logic 108. The power-controlling recovery logic 108 is configured to initiate recovery of the electronic device 106 using a power reset pattern 118. The power-controlling recovery logic 108 detects that the electronic device 106 is in a non-operational state. The power-controlling recovery logic 108 generates a power supply control signal 116. The power supply control signal 116 is configured to control timing of on states and off states of the power supply 104 in a manner that results in power pulses having respective durations. The power-controlling recovery logic 108 causes the electronic device 106 to initiate a recovery process using the power reset pattern 118 by providing the power supply control signal 116 to the power supply 104 via the first power line 112. In an aspect, by providing the power supply control signal 116 to the power supply 104, the power controlling recovery logic 108 causes the power supply to generate the power reset pattern 118. The power reset pattern 118 is defined by the power pulses having the respective durations. The recovery process is configured to change the electronic device 106 from the non-operational state to an operational state.

A power supply (e.g., the power supply 104) is a system that provides (e.g., supplies) electric power to an electronic device. An electronic device (e.g., electronic device 106) is a system that includes hardware that is configured to operate on electric power to perform one or more operations (e.g., processing data, transmitting a signal, or automating a task). The electronic device may further include software and/or firmware. For instance, the hardware (e.g., a processor therein) may execute the software and/or the firmware to perform the one or more operations. Examples of an electronic device include but are not limited to a computing system, a thermostat, an air quality monitoring device, a serial concentrator, a cable modem, a network interface (e.g., a network router), an electric fan, and an electric motor.

The power supply 104 receives the power supply control signal 116 from the computing system 102 (e.g., the power-controlling recovery logic 108 therein) via the first power line 112. The power supply 104 uses the power supply control signal 116 to generate the power reset pattern 118. In an aspect, receipt of the power supply control signal 116 triggers the power supply 104 to generate the power reset pattern 118. The power supply 104 provides the power reset pattern 118 to the electronic device 106 (e.g., power-based recovery logic 110 therein) via the second power line 114.

The electronic device 106 includes the power-based recovery logic 110. The power-based recovery logic 110 is configured to initiate recovery of the electronic device 106 using the power reset pattern 118. The power-based recovery logic 110 receives the power reset pattern 118 via the second power line 114 from the power supply 104. The power-based recovery logic 110 determines that the power reset pattern 118 is an instruction to initiate the recovery process. The power-based recovery logic 110 changes the electronic device 106 from the non-operational state to the operational state by initiating the recovery process (e.g., in response to determining that the power reset pattern 118 is the instruction to initiate the recovery process).

In an example embodiment, the power-based recovery logic 110 is incorporated into non-volatile memory of the electronic device 106. Non-volatile memory is memory that is capable of retaining stored information after power is removed from the memory. For example, the non-volatile memory may be capable of retaining stored information after a reboot of an electronic device (e.g., electronic device 1006) that includes the non-volatile memory. Examples of a non-volatile memory include but are not limited to a read-only memory (ROM), a hard disk drive (HDD), a solid-state drive (SDD), and a flash memory. Volatile memory is memory that is not capable of retaining stored information after power is removed from the memory. Examples of a volatile memory include but are not limited to a random access memory (RAM) and a cache memory.

In another example embodiment, the power-based recovery logic 110 is incorporated into immutable memory of the electronic device 106. Immutable memory is memory in which stored information (e.g., information written to the memory) is not capable of being altered and is not capable of being deleted. Examples of immutable memory include but are not limited to a ROM and write once, read many (WORM) storage. Mutable memory is memory in which stored information is capable of being altered and/or deleted. Examples of a mutable memory include but are not limited to a RAM, a cache memory, a HDD, a SDD, and a flash memory. In examples where the power-based recovery logic 110 stores reference counts in the immutable memory, security is enhanced since it is difficult for malicious actors to change the stored reference counts.

In yet another example embodiment, the power-based recovery logic 110 is incorporated into immutable, non-volatile memory of the electronic device 106.

Figure 2:
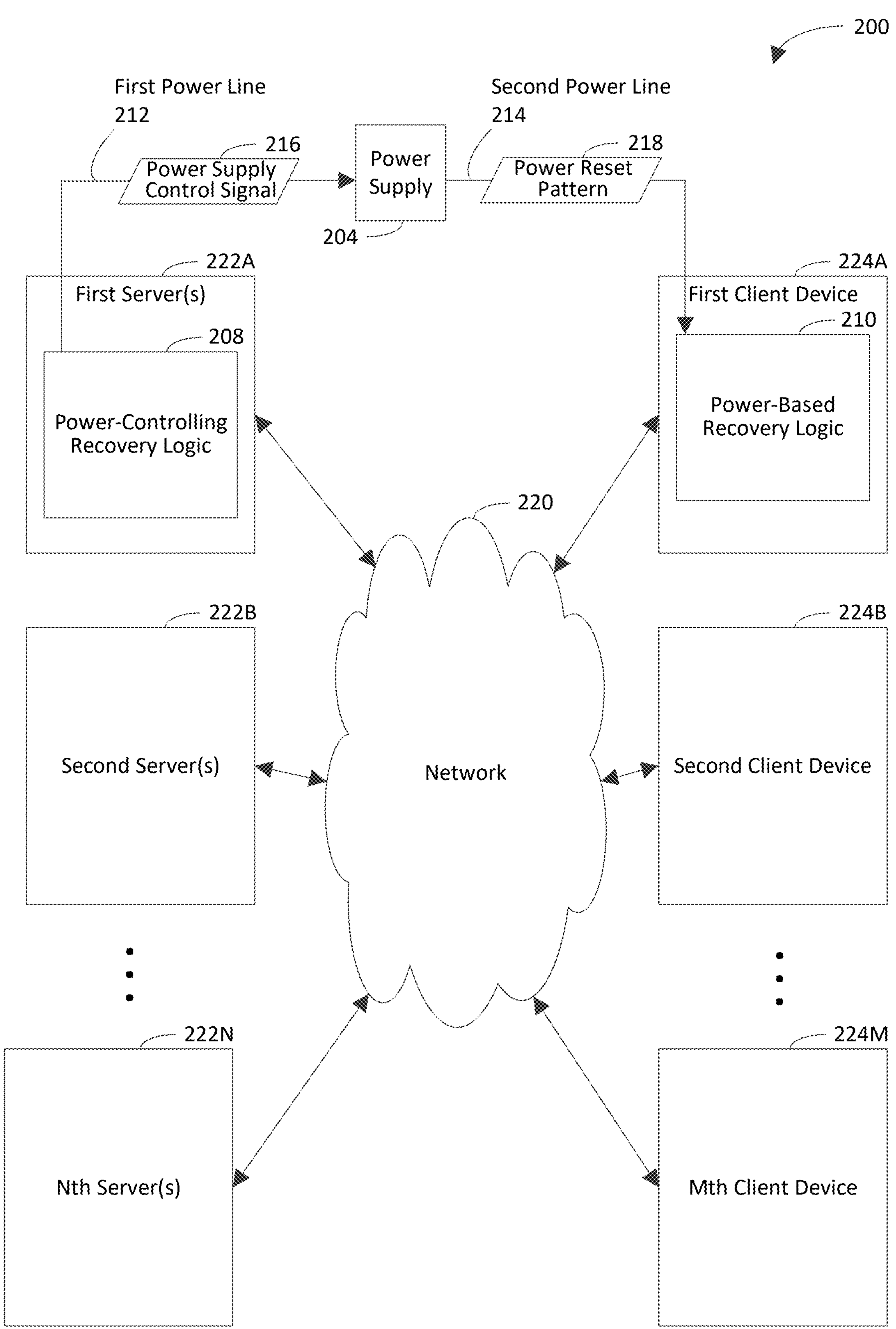

FIG. 2 is a block diagram of another example power reset pattern-based recovery system 200 in accordance with an embodiment. Generally speaking, the power reset pattern-based recovery system 200 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the power reset pattern-based recovery system 200 initiates recovery of one or more client devices 224A-224M using a power reset pattern 218. A client device is an example implementation of an electronic device. Detail regarding techniques for initiating recovery of one or more of the client devices 224A-224M using the power reset pattern 218 is provided in the following discussion.

As shown in FIG. 2, the power reset pattern-based recovery system 200 includes a power supply 204, a network 220, a plurality of servers 222A-222N, and a plurality of client devices 224A-224M. Communication among the servers 222A-222N and the client devices 224A-224M is carried out over the network 104 using well-known network communication protocols. The network 104 may be a wide-area network (e.g., the Internet), a local area network (LAN), another type of network, or a combination thereof. It will be recognized that any one or more of the servers 222A-222N may communicate with any one or more of the client devices 224A-224M. The first server(s) 222A are coupled to the power supply 204 via a first power line 212. The power supply 204 is coupled to the first client device 224A via a second power line 214.

The servers 222A-222N are computing systems that are capable of communicating with the client devices 224A-224M. The servers 222A-222N are configured to execute computer programs that provide information to users of client devices 224A-224M in response to receiving requests from the client devices 224A-224M. For example, the information may include documents (Web pages, images, audio files, video files, etc.), output of executables, or any other suitable type of information. In accordance with some example embodiments, the servers 222A-222N are configured to host respective Web sites, so that the Web sites are accessible to users of client devices 224A-224M of the power reset pattern-based recovery system 200.

The first server(s) 222A are shown to include power-controlling recovery logic 208 for illustrative purposes. The power-controlling recovery logic 208 is configured to initiate recovery of at least the first client device 224A using the power reset pattern 118. In an example implementation, the power-controlling recovery logic 208 detects that the first client device 224A is in a non-operational state. The power-controlling recovery logic 208 generates a power supply control signal 216. The power supply control signal 216 is configured to control timing of on states and off states of the power supply 204 in a manner that results in power pulses having respective durations. The power-controlling recovery logic 208 causes the first client device 224A to initiate a recovery process using the power reset pattern 218 by providing the power supply control signal 216 to the power supply 204 via the first power line 212. The power reset pattern 218 is defined by the power pulses having the respective durations. The recovery process is configured to change the first client device 224A from the non-operational state to an operational state.

The power supply 204 receives the power supply control signal 216 from the first server(s) 222A (e.g., the power-controlling recovery logic 208 therein) via the first power line 212. The power supply 204 uses the power supply control signal 216 to generate the power reset pattern 218. The power supply 204 provides the power reset pattern 218 to the first client device 224A (e.g., the power-based recovery logic 210 therein) via the second power line 214.

The client devices 224A-224M are computing systems that are capable of communicating with servers 222A-222N. The client devices 224A-224M are configured to provide requests to the servers 222A-222N for requesting information stored on (or otherwise accessible via) the servers 222A-222N. For instance, a user may initiate a request for executing a computer program (e.g., an application) using a client (e.g., a Web browser, Web crawler, or other type of client) deployed on a client device 224 that is owned by or otherwise accessible to the user. In accordance with some example embodiments, the client devices 224A-224M are capable of accessing domains (e.g., Web sites) hosted by the servers 104A-104N, so that the client devices 224A-224M may access information that is available via the domains. Such domain may include Web pages, which may be provided as hypertext markup language (HTML) documents and objects (e.g., files) that are linked therein, for example.

Each of the client devices 224A-224M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like.

The first client device 224A is shown to include power-based recovery logic 210 for illustrative purposes. The power-based recovery logic 210 is configured to initiate recovery of the first client device 224A using the power reset pattern 118. In an example implementation, the power-based recovery logic 210 receives the power reset pattern 218 via the second power line 214 from the power supply 204. The power-based recovery logic 210 determines that the power reset pattern 218 is an instruction to initiate the recovery process. The power-based recovery logic 210 changes the first client device 224A from the non-operational state to the operational state by initiating the recovery process (e.g., in response to determining that the power reset pattern 218 is the instruction to initiate the recovery process).

The power-controlling recovery logic 208 and/or the power-based recovery logic 210 may be implemented in various ways to initiate recovery of the first client device 224A using the power reset pattern 118, including being implemented in hardware, software, firmware, or any combination thereof. For example, the power-controlling recovery logic 208 and/or the power-based recovery logic 210 may be implemented as computer program code configured to be executed in one or more processors. In another example, at least a portion of the power-controlling recovery logic 208 and/or at least a portion of the power-based recovery logic 210 may be implemented as hardware logic/electrical circuitry. For instance, at least a portion of the power-controlling recovery logic 208 and/or at least a portion of the power-based recovery logic 210 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The power-controlling recovery logic 208 is shown to be incorporated in the first server(s) 222A for illustrative purposes and is not intended to be limiting. It will be recognized that the power-controlling recovery logic 208 (or any portion(s) or instance(s) thereof) may be incorporated in any one or more of the servers 222A-222N. For example, the first server(s) 222A may include a first portion of the power-controlling recovery logic 208 to facilitate recovery of any one or more of the client devices 224A-224M; the second server(s) 222B may include a second portion of the power-controlling recovery logic 208 to facilitate recovery of any one or more of the client devices 224A-224M, and so on. In another example, the first server(s) 222A may include a first instance of the power-controlling recovery logic 208 for recovering any one or more of the client devices 224A-224M; the second server(s) 222B may include a second instance of the power-controlling recovery logic 208 for recovering any one or more of the client devices 224A-224M, and so on. The power-based recovery logic 210 is shown to be incorporated in the first client device 224A for illustrative purposes and is not intended to be limiting. It will be recognized that the power-based recovery logic 210 (or any portion(s) or instance(s) thereof) may be incorporated in any one or more of the client devices 224A-224M. For example, the first client device 224A may include a first instance of the power-based recovery logic 210 for recovering the first client device 224A; the second client device 224B may include a second instance of the power-based recovery logic 210 for recovering the second client device 224B, and so on.

Figure 3:
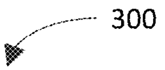
FIGS. 3 and 5 depict flowcharts of example methods for initiating recovery of an electronic device using a power reset pattern in accordance with embodiments.
Figure 3:
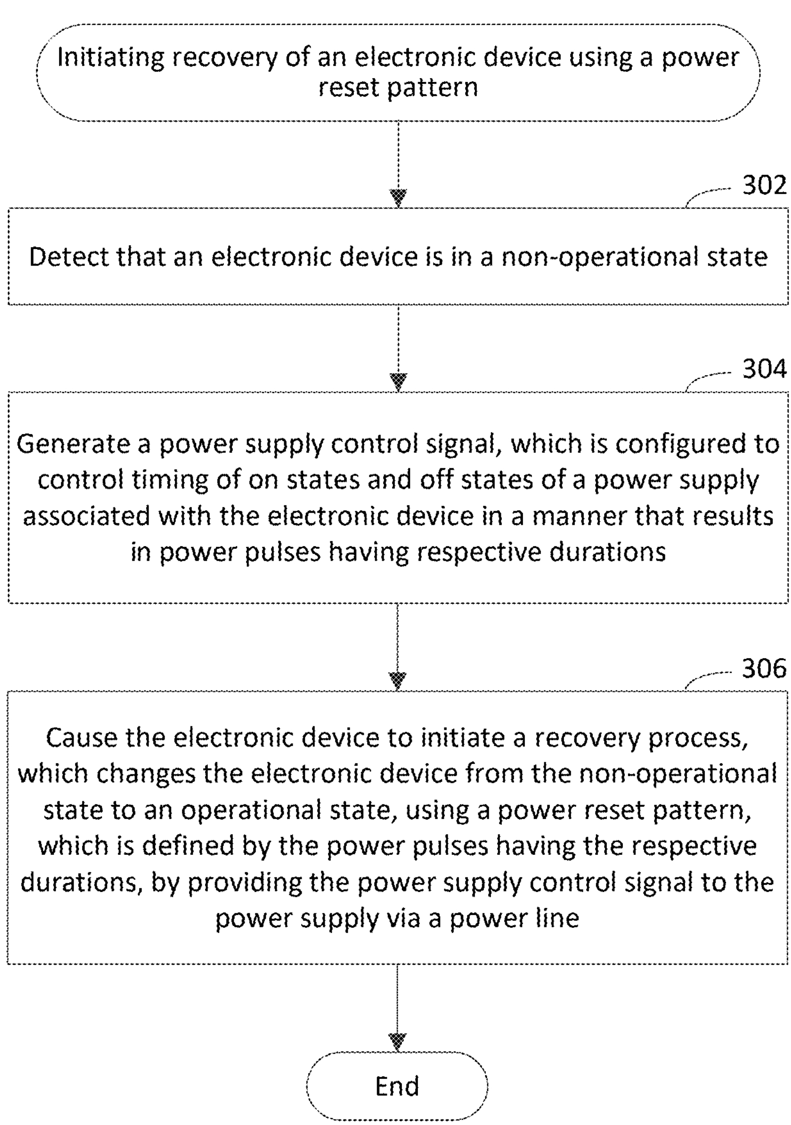
Figure 4:
FIG. 4 is a block diagram of an example computing system in accordance with an embodiment.
Figure 4:
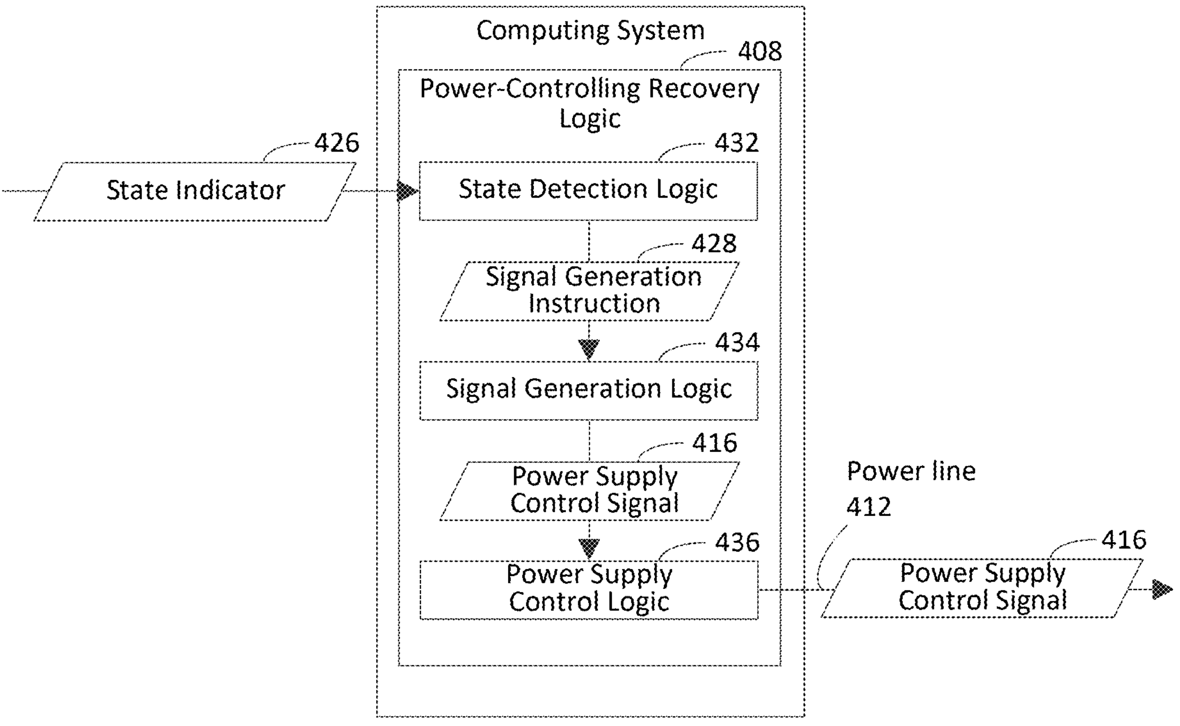

FIG. 3 depicts a flowchart 300 of an example method for initiating recovery of an electronic device using a power reset pattern in accordance with an embodiment. Flowchart 300 may be performed by a computing system (e.g., computing system 102 shown in FIG. 1 and/or the first server(s) 222A shown in FIG. 2). For illustrative purposes, flowchart 300 is described with respect to a computing system 400 shown in FIG. 4, which is an example implementation of the computing system 102 and/or the first server(s) 222A. As shown in FIG. 4, the computing system 400 includes power-controlling recovery logic 408. The power-controlling recovery logic 408 includes state detection logic 432, signal generation logic 434, and power supply control logic 436. Further structural and operational embodiments will be apparent to persons skilled in the relevant art(s) based on the discussion regarding flowchart 300.

As shown in FIG. 3, the method of flowchart 300 begins at step 302. In step 302, an electronic device being in a non-operational state is detected. Any of a variety of factors may cause the electronic device to be in the non-operational state. Examples of a factor that may cause the electronic device to be in the non-operational state include but are not limited to an operating system of the electronic device not functioning, an IP address of the electronic device being changed or being outside a permissible range of IP addresses, and an amount of voltage that is supplied to the electronic device being reduced below an operational threshold (e.g., from 12 Volts to 5 Volts). The operation threshold may be defined as a minimum amount of voltage that is to be supplied to the electronic device to enable the electronic device to perform a task. For instance, a component of the electronic device or the electronic device as a whole may stop functioning when a voltage that is less than the operational threshold is supplied to the electronic device.

In an example implementation, the state detection logic 432 detects that the electronic device is in the non-operational state. For example, the state detection logic 432 may make the determination as a result of a state indicator 426 indicating that the electronic device is in the non-operational state. In an aspect, the state detection logic 432 monitors a state of the electronic device at periodic intervals. In accordance with this aspect, the state detection logic 432 receives the state indicator 426 periodically to indicate the state of the electronic device at the periodic intervals. In accordance with this aspect, the state indicator 426 having a first value (e.g., a first binary value, such as "1") indicates that the electronic device is in the non-operational state. In further accordance with this aspect, the state indicator 426 having a second value (e.g., a second binary value, such as "0") indicates that the electronic device is in an operational state. In another aspect, the state detection logic 432 receives the state indicator 426 asynchronously. For instance, generation of the state indicator 426 may be triggered by the electronic device entering the non-operational state. In accordance with this aspect, receipt of the state indicator 426 indicates that the electronic device is in the non-operational state (e.g., regardless of a value of the state indicator 426). In another example, the state detection logic 432 may determine that the electronic device is in the non-operational state as a result of not receiving the state indicator 426. In an aspect, the state detection logic 432 transmits a ping signal to the electronic device to solicit a response, including the state indicator 426, from the electronic device. In accordance with this aspect, a failure to receive the state indicator 426 at the state detection logic 432 from the electronic device within a specified amount of time (e.g., 0.5 seconds, 10 seconds, or 2 minutes) following transmission of the ping signal to the electronic device indicates that the electronic device is in the non-operational state. The state detection logic 432 generates a signal generation instruction 428, which indicates that the electronic device is in the non-operational state. In an aspect, the signal generation instruction 428 instructs the signal generation logic 434 to generate a power supply control signal 416 for initiating recovery of the electronic device.

At step 304, a power supply control signal is generated. The power supply control signal is configured to control timing of on states and off states of a power supply associated with the electronic device in a manner that results in power pulses having respective durations. In an aspect, detecting that the electronic device is in the non-operational state at step 302 triggers (e.g., automatically triggers) generation of the power supply control signal at step 304. In another aspect, the power supply control signal including a first attribute triggers the power supply to enter an on state. In accordance with this aspect, the power supply control signal including a second attribute, which is different from the first attribute, triggers the power supply to enter an off state. Examples of an attribute include but are not limited to a current (e.g., an amount of current), a voltage level, a frequency, signal timing, a signal edge (e.g., a rising edge or a falling edge), a phase, and a digital code (e.g., a binary code or a pattern). An on state of the power supply is a state in which the power supply supplies power to the electronic device (e.g., provides an amount of power that is sufficient to turn on the electronic device). An off state of the power supply is a state in which the power supply does not supply power to the electronic device (e.g., does not provide an amount of power that is sufficient to turn on the electronic device). In an aspect, a duration of a power pulse is defined by a difference between a beginning time at which the power supply transitions from an off state to an on state and an ending time at which the power supply transitions from the on state to the off state. For example, a temporally first power pulse may be defined by a first beginning time at which the power supply enters the on state and a first ending time at which the power supply enters the off state; a temporally second power pulse may be defined by a second beginning time at which the power supply re-enters the on state and a second ending time at which the power supply re-enters the off state, and so on. In accordance with this example, the first beginning time occurs before the first ending time, which occurs before the second beginning time, which occurs before the second ending time, and so on.

In an example implementation, the signal generation logic 434 generates the power supply control signal 416. The power supply control signal 416 is configured to control the timing of the on states and the off states of the power supply associated with the electronic device in a manner that results in the power pulses having the respective durations. In some examples, the power-controlling recovery logic 408 knows a reference count of the electronic device. The power supply control signal 416 controls the timing of the on states and the off states of the power supply in order to correspond with the reference count of the electronic device. The power controlling recovery logic 408 may know the reference count of the electronic device as a result of the reference count having been shared by the electronic device in a secure manner, or in other ways.

At step 306, the electronic device is caused to initiate a recovery process using a power reset pattern by providing the power supply control signal to the power supply via a power line. The power reset pattern is defined by the power pulses having the respective durations. A power line is a physical transmission medium via which power is supplied to a system (e.g., an electronic device or a power supply associated with the electronic device) by connecting the system to an energy source. It will be recognized that a power supply is one example type of an energy source. In an aspect, the power enables the system to function as the system is configured to operate. The recovery process changes the electronic device from the non-operational state to an operational state. Examples of a recovery process include but are not limited to returning the electronic device to factory settings (e.g., reconfiguring the electronic device to have the factory settings), reconfiguring the electronic device to have one or more other default settings, removing data having a priority that is less than or equal to a priority threshold from the electronic device, and removing or disabling a most recent configuration update to the electronic device. A factory setting is a setting that is established by a manufacturer of the electronic device. For instance, returning the electronic device to the factory settings may restore the electronic device to its initial operational condition (e.g., as originally established by the manufacturer). In an aspect, providing the power supply control signal to the power supply via the power line causes the power supply to trigger (e.g., automatically trigger) the electronic device to initiate the recovery process using the power reset pattern. In an example of this aspect, providing the power supply control signal to the power supply via the power line triggers the power supply to provide the power reset pattern to the electronic device, which triggers the electronic device to initiate the recovery process using the power reset pattern. In an example implementation, the power supply control logic 436 causes the electronic device to initiate the recovery process using the power reset pattern by providing the power supply control signal 416 to the power supply via a power line 412.

In an example embodiment, the respective durations of the power pulses define an encoded sequence of values that is configured to trigger initiation of the recovery process. For example, a first duration of a temporally first power pulse may define a first value; a second duration of a temporally second power pulse may define a second value, and so on. In accordance with this example, the a combination of the first value, the second value, and so on (e.g., in an order in which the power pulses whose durations define the values are received) may constitute the encoded sequence of values. In an aspect, the encoded sequence of values includes (e.g., is) an encoded sequence of alphanumeric characters or an encoded sequence of binary values. For example, the sequence of alphanumeric characters may include (e.g., be) a serial number assigned to the electronic device (e.g., by a manufacturer of the electronic device).

In another example embodiment, providing the power supply control signal to the power supply via the power line at step 306 includes triggering the power supply to perform a sequence of power resets on the electronic device using the power reset pattern. A power reset in the sequence is initiated by a corresponding on state of the power supply and is terminated by a corresponding off state of the power supply. For example, an on state of the power supply may be initiated by connecting the power supply to a battery. In accordance with this example, an off state of the power supply may be initiated by disconnecting the power supply from the battery.

In yet another example embodiment, the power reset pattern is a device-specific power reset pattern that is configured to limit initiation of the recovery process to the electronic device. In accordance with this embodiment, electronic devices other than the electronic device that receive the device-specific power reset pattern may not initiate the recovery process.

In still another example embodiment, the power supply is associated with multiple electronic devices, including the electronic device. In accordance with this aspect, causing the electronic device to initiate the recovery process at step 306 includes causing the electronic devices to initiate the recovery process using the power reset pattern by providing the power supply control signal to the power supply via the power line. In further accordance with this aspect, the recovery process changes the electronic devices from the non-operational state to the operational state.

In an aspect of this embodiment, the power reset pattern is a device-type power reset pattern, which is configured to limit initiation of the recovery process to a specified device type. Examples of a device type include but are not limited to a graphics processing unit (GPU) type, a central processing unit (CPU) type, a printer type, and a manufacturer-specific type. A GPU type includes electronic devices that are GPUs. A CPU type includes electronic devices that are CPUs. A printer type includes electronic devices that are printers. A manufacturer-specific type includes electronic devices that are manufactured by a particular manufacturer. In accordance with this aspect, the electronic devices are caused to initiate the recovery process using the power reset pattern as a result of the electronic devices being the specified device type.

In another example embodiment, detecting that the electronic device is in the non-operational state at step 302 includes detecting that the electronic device is unable to communicate with the computing system via a communication channel between the computing system and the electronic device. Examples of a communication channel include but are not limited to the Internet, a serial port, a parallel port, an Ethernet™ channel (e.g., connection), a Wi-Fi® channel, a Bluetooth® channel, a universal serial bus (USB®) channel, a FireWire® (IEEE 1394 standard) channel, a cellular channel (e.g., a cellular network), and an infrared channel. The electronic device being unable to communicate with the computing system may be detected by transmitting a signal to the electronic device via the communication channel and detecting a failure of the electronic device to provide an expected response in response to the signal (e.g., a failure of the electronic device to provide a response at all). An expected response is a response that the electronic device has been configured to provide. In accordance with this embodiment, causing the electronic device to initiate the recovery process at step 306 causes the electronic device to be capable of communicating with the computing system via the communication channel. For example, causing the electronic device to initiate the recovery process at step 306 may include causing the electronic device to perform the recovery process. In accordance with this example, performance of the recovery process causes the electronic device to be capable of communicating with the computing system via the communication channel. For instance, performance of the recovery process may change an attribute of the electronic device to enable the electronic device to communicate with the computing system via the communication channel. Examples of an attribute include but are not limited to a configuration setting of the electronic device (e.g., a configuration setting of a hardware component of the electronic device), code that is stored and/or executed by the electronic device, a registry of the electronic device, and so on.

In yet another example embodiment, detecting that the electronic device is in the non-operational state at step 302 includes detecting that logic that is stored in a non-volatile memory of the electronic device is in the non-operational state. Examples of logic include but are not limited to code, a data structure, a lookup table, and a register. Examples of code include but are not limited to firmware (e.g., basic input/output system (BIOS)) and software (e.g., an application or an operating system). In accordance with this embodiment, causing the electronic device to initiate the recovery process at step 306 changes the logic that is stored in the non-volatile memory of the electronic device from the non-operational state to the operational state.

In an aspect of this embodiment, detecting that logic is in the non-operational state includes detecting that code that is stored in a mutable, non-volatile memory of the electronic device is in the non-operational state. In accordance with this aspect, causing the electronic device to initiate the recovery process at step 306 changes the code that is stored in the mutable, non-volatile memory of the electronic device from the non-operational state to the operational state.

In another aspect of this embodiment, detecting that logic is in the non-operational state includes detecting that a current version of code that is stored in the non-volatile memory of the electronic device is in the non-operational state. In accordance with this aspect, causing the electronic device to initiate the recovery process at step 306 causes the current version of the code that is stored in the non-volatile memory of the electronic device to be replaced with a previous version of the code that precedes the current version (e.g., that has a release date that precedes a release date of the current version). In an aspect the previous version of the code is in the operational state. In accordance with this aspect, causing the current version of the code to be replaced with the previous version of the code changes the electronic device from the non-operational state to the operational state.

In still another example embodiment, detecting that the electronic device is in the non-operational state at step 302 includes detecting that a configuration setting of the electronic device causes the electronic device to be in the non-operational state. A configuration setting of an electronic device is an adjustable parameter that controls a manner in which the electronic device operates. In an aspect, the configuration setting controls functionality of the electronic device. In accordance with this embodiment, causing the electronic device to initiate the recovery process at step 306 changes the configuration setting of the electronic device, which causes the electronic device to be changed from the non-operational state to the operational state.

In an example embodiment, detecting that the electronic device is in the non-operational state at step 302 includes detecting that a hardware component in the electronic device is in the non-operational state. A hardware component in an electronic device is a physical part of the electronic device. Examples of a hardware component include but are not limited to circuitry, a CPU, a GPU, a solid-state drive (SSD), a cable modem, a network interface (e.g., a network router), random access memory (RAM), a motherboard, a sound card, and a display (e.g., monitor). In accordance with this embodiment, causing the electronic device to initiate the recovery process at step 306 changes the hardware component in the electronic device from the non-operational state to the operational state.

In another example embodiment, generating the power supply control signal at step 304 includes selecting the power supply control signal from power supply control signals, which are configured to trigger the power supply to perform respective recovery processes, as a result of an attribute of the electronic device satisfying a recovery criterion. In accordance with this embodiment, causing the electronic device to initiate the recovery process at step 306 includes, in response to selecting the power supply control signal from the power supply control signals, providing the power supply control signal, rather than another power supply control signal from the power supply control signals, to the power supply via the power line.

In some example embodiments, one or more steps 302, 304, and/or 306 of flowchart 300 may not be performed. Moreover, steps in addition to or in lieu of steps 302, 304, and/or 306 may be performed.

It will be recognized that the computing system 400 may not include one or more of the power-controlling recovery logic 408, the state detection logic 432, the signal generation logic 434, and/or the power supply control logic 436. Furthermore, the computing system 400 may include components in addition to or in lieu of the power-controlling recovery logic 408, the state detection logic 432, the signal generation logic 434, and/or the power supply control logic 436.

Figure 5:
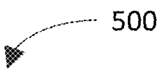
Figure 5:
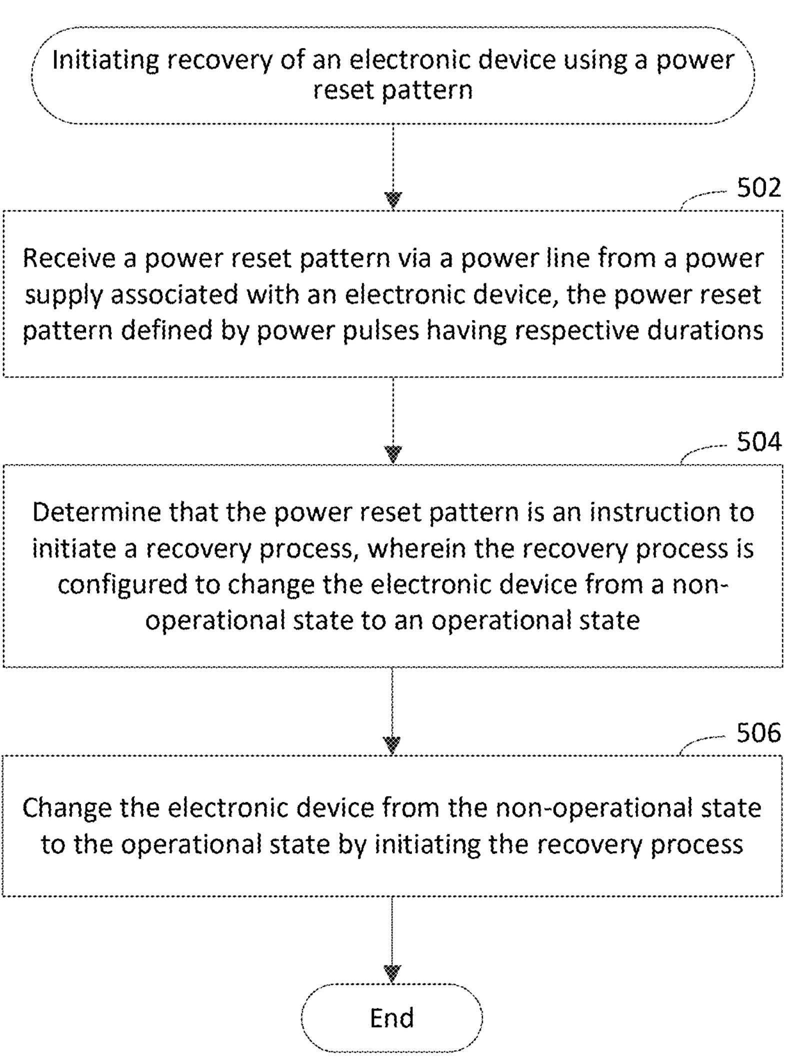
Figure 6:
FIG. 6 is a block diagram of an example electronic device in accordance with an embodiment.
Figure 6:
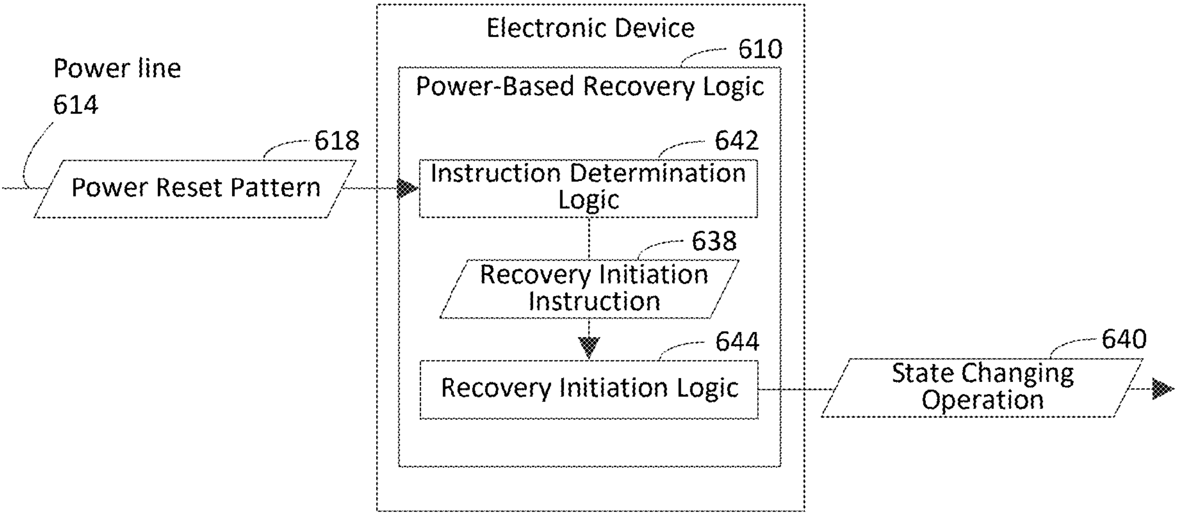

FIG. 5 depicts a flowchart 500 of another example method for initiating recovery of an electronic device using a power reset pattern in accordance with an embodiment. Flowchart 500 may be performed by an electronic device (e.g., electronic device 106 shown in FIG. 1 and/or the first client device 224A shown in FIG. 2). For illustrative purposes, flowchart 500 is described with respect to an electronic device 600 shown in FIG. 6, which is an example implementation of the electronic device 106 and/or the first client device 224A. As shown in FIG. 6, the electronic device 600 includes power-based recovery logic 610. The power-based recovery logic 610 includes instruction determination logic 642 and recovery initiation logic 644. Further structural and operational embodiments will be apparent to persons skilled in the relevant art(s) based on the discussion regarding flowchart 500.

As shown in FIG. 5, the method of flowchart 500 begins at step 502. In step 502, a power reset pattern is received via a power line from a power supply associated with the electronic device. The power reset pattern is defined by power pulses having respective durations. In an example implementation, the instruction determination logic 642 receives a power reset pattern 618 via a power line 614 from a power supply associated with the electronic device 600. The power reset pattern 618 is defined by power pulses having respective durations.

In an example embodiment, receiving the power reset pattern at step 502 includes triggering a sequence of power resets of the electronic device. A power reset in the sequence is initiated by a corresponding on state of the power supply and is terminated by a corresponding off state of the power supply. In an example implementation, the instruction determination logic 642 receiving the power reset pattern 618 triggers the sequence of power resets of the electronic device 600. In an aspect of this embodiment, the power reset pattern is a device-specific power reset pattern that is configured to limit performance of the sequence of power resets to the electronic device. In another aspect of this embodiment, the power reset pattern is a device-type power reset pattern that is configured to limit performance of the sequence of power resets to electronic devices of a specified device type. In accordance with this aspect, the sequence of power resets of the electronic device is triggered as a result of the electronic devices of the specified device type including the electronic device.

At step 504, a determination is made that the power reset pattern is (e.g., constitutes) an instruction to initiate a recovery process. The recovery process is configured to change the electronic device from a non-operational state to an operational state. In an example implementation, the instruction determination logic 642 determines that the power reset pattern 618 is an instruction to initiate the recovery process. In accordance with this implementation, the recovery process is configured to change the electronic device 600 from the non-operational state to the operational state. The instruction determination logic 642 generates a recovery initiation instruction 638, which instructs the recovery initiation logic 644 to initiate the recovery process. In an aspect, the instruction determination logic 642 generates the recovery initiation instruction 638 in response to (e.g., as a result of) determining that the power reset pattern 618 is the instruction to initiate the recovery process.

In an example embodiment, a power pulse having a duration that is greater than a duration threshold (e.g., 10 seconds, 30 seconds, or one minute) indicates that the power reset pattern has ended. For instance, each of the durations of the power pulses that define the power reset pattern may be less than the duration threshold. In an example implementation, the duration threshold is one minute, and the power reset pattern is defined by a first power pulse having a duration of 47 seconds and a second power pulse having a duration of 19 seconds. In accordance with this implementation, assume that the first power pulse having the duration of 47 seconds, the second power pulse having the duration of 19 seconds, and a third power pulse having a duration that is greater than one minute are received. In further accordance with this implementation, the determination is made that the power reset pattern is the instruction to initiate the recovery process as a result of determining that the first and second power pulses have the respective durations and further as a result of determining that the third power pulse having a duration that is greater than one minute indicates that the power reset pattern is defined by the first power pulse and the second power pulse. For instance, the third power pulse having the duration that is greater than one minute may indicate that the third power pulse is not to be taken into consideration when determining whether the power reset pattern is the instruction to initiate the recovery process.

In another example embodiment, a power pulse having a duration that is less than or equal to a threshold duration is identified as a temporally first power pulse in a power reset pattern as a result of a previous power pulse, which immediately precedes the power pulse, having a duration that is greater than the threshold duration. A previous power pulse may be deemed to immediately precede power pulse(s) as a result of no other power pulses being received at the electronic device between the previous power pulse and the power pulse(s). For instance, a temporally first power pulse of the power pulse(s) need not necessarily be received at the electronic device within a threshold amount of time after the previous power pulse. In an aspect of this embodiment, the power reset pattern may be identified as the instruction to initiate the recovery process at step 504 as a result of (e.g., based at least in part on) a previous power pulse, which immediately precedes the power pulses that define the power reset pattern, having a duration that is greater than the threshold duration.

In yet another example embodiment, the power reset pattern is determined to be the instruction to initiate the recovery process at step 504 as a result of the power pulses that define the power reset pattern being immediately preceded by a previous power pulse having a duration that is greater than a duration threshold and further as a result of a subsequent power pulse, which immediately follows the power pulses that define the power reset pattern, having a duration that is greater than the duration threshold. A subsequent power pulse may be deemed to immediately follow power pulse(s) as a result of no other power pulses being received at the electronic device between the power pulse(s) and the subsequent power pulse. For instance, the subsequent power pulse need not necessarily be received at the electronic device within a threshold amount of time after a temporally last power pulse of the power pulse(s).

In another example embodiment, a power pulse having a duration that is less than or equal to a threshold duration may be identified as a temporally first power pulse in a power reset pattern as a result of determining that a previous power reset pattern, which immediately precedes the power pulse, is not (e.g., does not constitute) the instruction to initiate the recovery process. For instance, determining that the previous power reset pattern is not the instruction may result in an analysis of incoming power pulses to be restarted for purposes of determining whether a power reset pattern defined by the incoming power pulses or a subset thereof is (e.g., constitutes) the instruction to initiate the recovery process. A previous power reset pattern may be deemed to immediately precede power pulse(s) as a result of no other power pulses being received at the electronic device between the previous power reset pattern and the power pulse(s). For example, a temporally first power pulse of the power pulse(s) need not necessarily be received at the electronic device within a threshold amount of time after a temporally last power pulse of the power pulses that define the previous power reset pattern.

In an aspect of this embodiment, the power reset pattern is determined to be the instruction to initiate the recovery process at step 504 as a result of the power pulses that define the power reset pattern being immediately preceded by the previous power reset pattern, which is not the instruction to initiate the recovery process, and further as a result of a subsequent power pulse, which immediately follows the power pulses that define the power reset pattern, having a duration that is greater than a duration threshold.

In yet another example embodiment, a power pulse having a duration that is less than or equal to a threshold duration may be identified as a temporally first power pulse in a power reset pattern as a result of an amount of time that passes between a first time instance at which a previous power pulse, which immediately precedes the power pulse, is received at the electronic device and a second time instance at which the power pulse is received at the electronic device being greater than or equal to a time threshold. For instance, the time threshold may be a fixed amount of time (e.g., 10 seconds, 30 seconds, or one minute).

In still another example embodiment, a power pulse having a duration that is less than or equal to a threshold duration may be identified as a temporally first power pulse in a power reset pattern as a result of a duration of a previous power pulse, which immediately precedes the power pulse, not being within a specified range of durations. For instance, the specified range of durations may be from 5 seconds to 40 seconds, from 10 seconds to one minute, or from 20 seconds to 90 seconds.

In another example embodiment, the respective durations of the power pulses define an encoded sequence of values that is configured to trigger initiation of the recovery process. In accordance with this embodiment, the determination is made that the power reset pattern is the instruction to initiate the recovery process at step 504 as a result of the respective durations of the power pulses defining the encoded sequence of values that is configured to trigger initiation of the recovery process.

At step 506, the electronic device is changed from the non-operational state to the operational state by initiating the recovery process. In an aspect, the electronic device is changed from the non-operational state to the operational state in response to determining that the power reset pattern is the instruction to initiate the recovery process. In an example of this aspect, determining that the power reset pattern is the instruction to initiate the recovery process at step 504 triggers (e.g., automatically triggers) initiation of the recovery process, which changes the electronic device from the non-operational state to the operational state, at step 506. In an example implementation, the recovery initiation logic 644 performs a state changing operation 640, which changes the electronic device 600 from the non-operational state to the operational state by initiating the recovery process. For instance, the recovery initiation logic 644 may initiate the recovery process in response to receipt of the recovery initiation instruction 638 (e.g., in response to the recovery initiation instruction 638 instructing the recovery initiation logic 644 to initiate the recovery process).

In an example embodiment, the recovery process is configured to cause the electronic device to be capable of communicating with a computing system via a communication channel. In accordance with this embodiment, changing the electronic device from the non-operational state to the operational state at step 506 includes changing the electronic device from the non-operational state in which the electronic device is unable to communicate with the computing system via the communication channel to the operational state in which the electronic device is capable of communicating with the computing system via the communication channel.

In another example embodiment, the recovery process is configured to change logic that is stored in a non-volatile memory of the electronic device from the non-operational state to the operational state. In accordance with this embodiment, changing the electronic device from the non-operational state to the operational state at step 506 includes changing the logic that is stored in the non-volatile memory of the electronic device from the non-operational state to the operational state.

In yet another example embodiment, the recovery process is configured to change code that is stored in a mutable, non-volatile memory of the electronic device from the non-operational state to the operational state. In accordance with this embodiment, changing the electronic device from the non-operational state to the operational state at step 506 includes changing the code that is stored in the mutable, non-volatile memory of the electronic device from the non-operational state to the operational state.

In still another example embodiment, the recovery process is configured to replace a current version of code that is stored in the non-volatile memory of the electronic device with a previous version of the code that precedes the current version. The current version of the code is in the non-operational state. The previous version of the code is in the operational state. In accordance with this embodiment, changing the electronic device from the non-operational state to the operational state at step 506 includes replacing the current version of the code that is stored in the non-volatile memory of the electronic device with the previous version of the code that precedes the current version.

In another example embodiment, the recovery process is configured to cause a configuration setting of the electronic device to be changed from a value to an other value. In accordance with this embodiment, changing the electronic device from the non-operational state to the operational state at step 506 includes changing the configuration setting of the electronic device from the value to the other value, which causes the electronic device to be changed from the non-operational state to the operational state.

In yet another example embodiment, the recovery process is configured to change a hardware component in the electronic device from the non-operational state to the operational state. In accordance with this embodiment, changing the electronic device from the non-operational state to the operational state at step 506 includes changing the hardware component in the electronic device from the non-operational state to the operational state.

In some example embodiments, one or more steps 502, 504, and/or 506 of flowchart 500 may not be performed. Moreover, steps in addition to or in lieu of steps 502, 504, and/or 506 may be performed.

It will be recognized that the electronic device 600 may not include one or more of the power-based recovery logic 610, the instruction determination logic 642, and/or the recovery initiation logic 644. Furthermore, the electronic device 600 may include components in addition to or in lieu of the power-based recovery logic 610, the instruction determination logic 642, and/or the recovery initiation logic 644.

Figure 7:
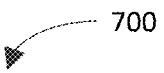
FIG. 7 depicts a flowchart of an example method for determining that a power reset pattern is an instruction to initiate a recovery process in accordance with an embodiment.
Figure 7:
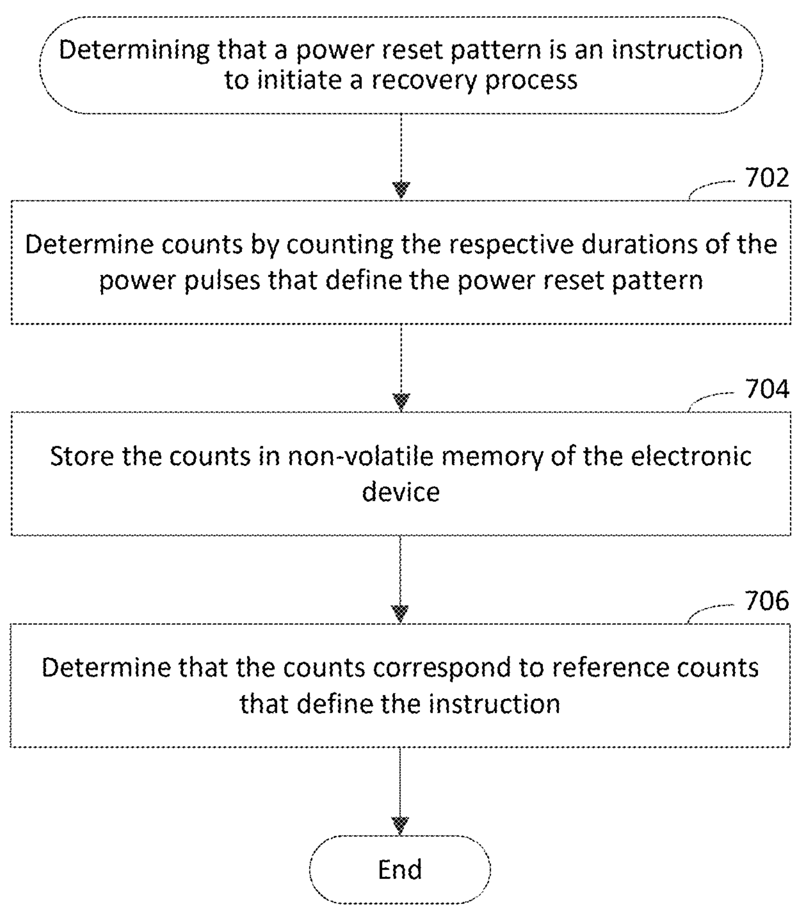
Figure 8:
FIG. 8 is a block diagram of an example implementation of instruction determination logic shown in FIG. 6 in accordance with an embodiment.
Figure 8:
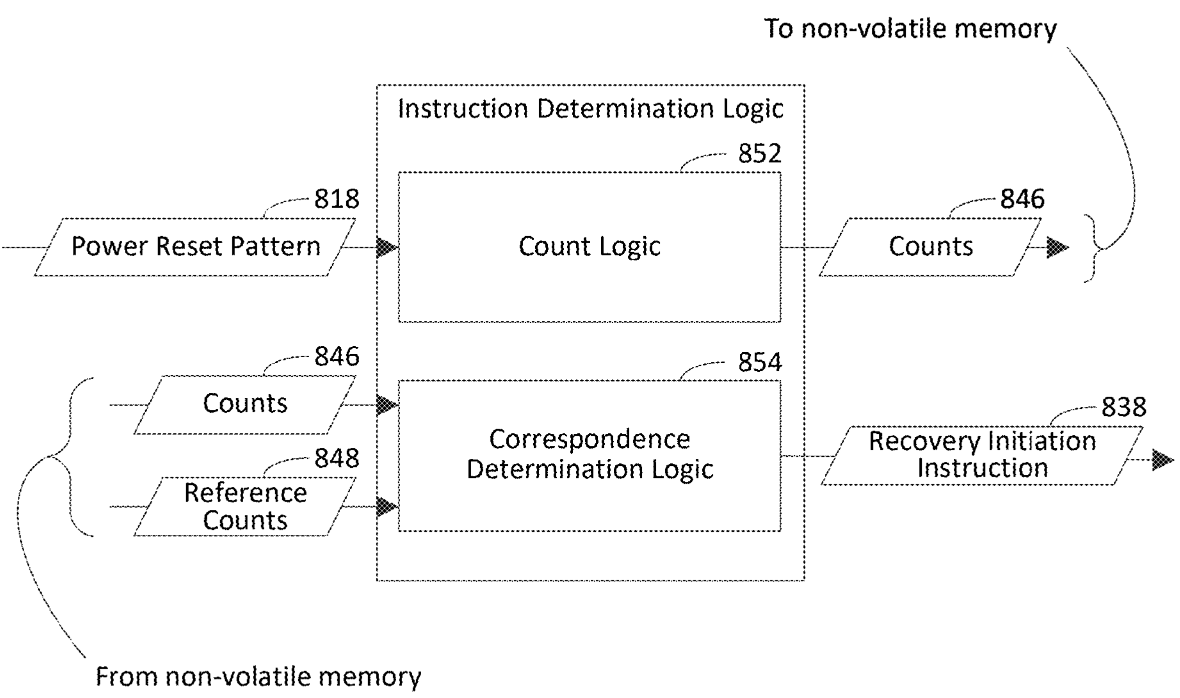

FIG. 7 depicts a flowchart 700 of an example method for determining that a power reset pattern is an instruction to initiate a recovery process in accordance with an embodiment. For instance, step 504 shown in FIG. 5 may include any one or more steps of flowchart 700. Flowchart 700 may be performed by instruction determination logic 642 shown in FIG. 6. For illustrative purposes, flowchart 700 is described with respect to instruction determination logic 800 shown in FIG. 8, which is an example implementation of the instruction determination logic 642. As shown in FIG. 8, the instruction determination logic 800 includes count logic 852 and correspondence determination logic 854. Further structural and operational embodiments will be apparent to persons skilled in the relevant art(s) based on the discussion regarding flowchart 700.

As shown in FIG. 7, the method of flowchart 700 begins at step 702. In step 702, counts are determined by counting the respective durations of the power pulses that define the power reset pattern. In an aspect, a first count represents (e.g., indicates) a first duration of a temporally first power pulse; a second count represents a second duration of a temporally second power pulse, and so on. In an example embodiment, a duration of a power pulse may be divided by a number, N, to determine a count that is indicated by the duration of the power pulse. In an example in which N=10, a first duration of 20 seconds may correspond to a first count of two (e.g., 20/10=2), and a second duration of 50 seconds may correspond to a second count of five (e.g., 50/10=5). In an example in which N=5, a first duration of 10 seconds may correspond to a first count of two (e.g., 10/5=2), and a second duration of 35 may correspond to a second count of seven (e.g., 35/5=7). In another example embodiment, a count for a power pulse is equal to a number of seconds in a duration of the power pulse. For example, a first duration of 12 seconds may correspond to a first count of 12, and a second duration of 17 seconds may correspond to a second count of 17. These count determination techniques are provided for illustrative purposes and are not intended to be limiting. It will be recognized that any suitable technique may be used to determine the counts for the power pulses that define the power reset pattern. In an example implementation, the count logic 852 determines counts 846 by counting the respective durations of the power pulses that define a power reset pattern 818.

At step 704, the counts are stored in non-volatile memory of the electronic device. In an aspect, the non-volatile memory is a mutable, non-volatile memory. In an example implementation, the count logic 852 stores the counts 846 in the non-volatile memory of the electronic device.

At step 706, a determination is made that the counts correspond to reference counts that define the instruction. The reference counts are securely stored in the electronic device during manufacture in some cases. Where the reference counts are configured in the electronic device during manufacture, security is enhanced because it is difficult for a malicious party to obtain physical access to the electronic device to obtain the reference counts. In some examples the reference counts are sent to the electronic device by the computing system using a secure communications channel. For instance, the determination may indicate that the counts and the reference counts are same.

In an example implementation, the correspondence determination logic 854 determines that the counts 846 correspond to reference counts 848 that define the instruction. In this way, security is enhanced since a power reset pattern 818 that is generated by a malicious actor and that does not have counts corresponding to the reference counts is blocked by the correspondence determination logic 854. Robustness is enhanced since a power reset pattern 818 resulting from noise in a power supply does not have counts corresponding to the reference counts and is blocked by the correspondence determination logic 854. The correspondence determination logic 854 generates a recovery initiation instruction 838, which indicates that a recovery process is to be initiated (e.g., by the recovery initiation logic 644 shown in FIG. 6). For instance, the correspondence determination logic 854 may generate the recovery initiation instruction 838 as a result of determining that the counts 846 correspond to the reference counts 848. In some cases, the correspondence determination logic 854 only generates the recovery initiation instruction 838 in response to the instruction determination logic 800 determining that the electronic device is currently in an idle state, such as by checking a level of power being drawn by the electronic device is below a threshold. In this way, security is enhanced since a malicious power reset pattern 818 that has counts corresponding to the reference counts only triggers a state changing operation when the electronic device is in a non-operational state.

In some example embodiments, one or more steps 702, 704, and/or 706 of flowchart 700 may not be performed. Moreover, steps in addition to or in lieu of steps 702, 704, and/or 706 may be performed.

It will be recognized that the instruction determination logic 800 may not include one or more of the count logic 852 and/or the correspondence determination logic 854. Furthermore, the instruction determination logic 800 may include components in addition to or in lieu of the count logic 852 and/or the correspondence determination logic 854.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the power-controlling recovery logic 108, the power-based recovery logic 110, the power-controlling recovery logic 208, the power-based recovery logic 210, the power-controlling recovery logic 408, the state detection logic 432, the signal generation logic 434, the power supply control logic 436, the power-based recovery logic 610, the instruction determination logic 642, the recovery initiation logic 644, the instruction determination logic 800, the count logic 852, the correspondence determination logic 854, flowchart 300, flowchart 500, and/or flowchart 700 may be implemented in hardware, software, firmware, or any combination thereof.

For example, any one or more of the power-controlling recovery logic 108, the power-based recovery logic 110, the power-controlling recovery logic 208, the power-based recovery logic 210, the power-controlling recovery logic 408, the state detection logic 432, the signal generation logic 434, the power supply control logic 436, the power-based recovery logic 610, the instruction determination logic 642, the recovery initiation logic 644, the instruction determination logic 800, the count logic 852, the correspondence determination logic 854, flowchart 300, flowchart 500, and/or flowchart 700 may be implemented, at least in part, as computer program code configured to be executed in one or more processors.

In another example, any one or more of the power-controlling recovery logic 108, the power-based recovery logic 110, the power-controlling recovery logic 208, the power-based recovery logic 210, the power-controlling recovery logic 408, the state detection logic 432, the signal generation logic 434, the power supply control logic 436, the power-based recovery logic 610, the instruction determination logic 642, the recovery initiation logic 644, the instruction determination logic 800, the count logic 852, the correspondence determination logic 854, flowchart 300, flowchart 500, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
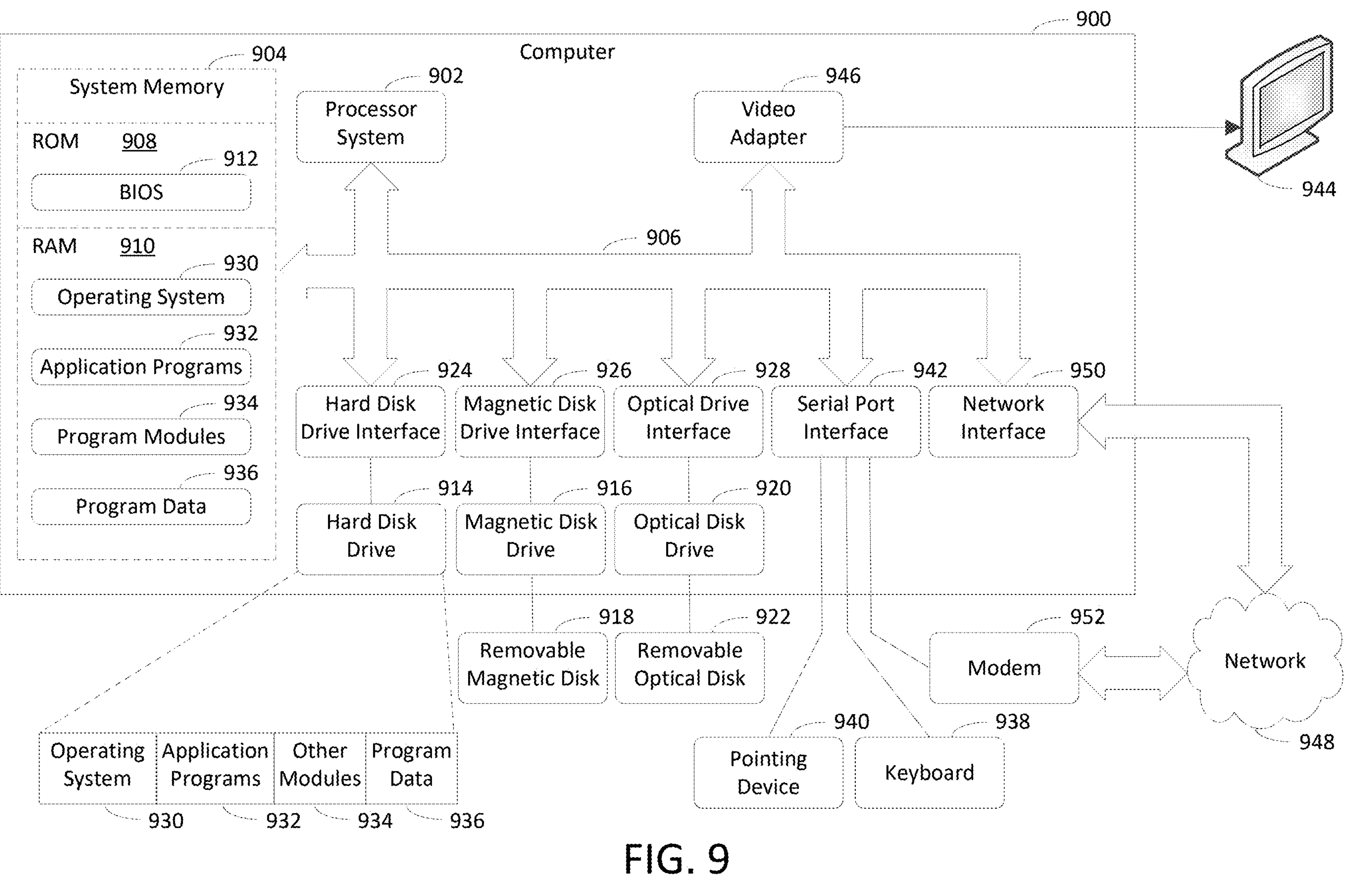
FIG. 9 depicts an example computer in which embodiments may be implemented.

II. Further Discussion of Some Example Embodiments (A1) An example computing system (FIGS. 1, 102; FIG. 2, 222A-222N; FIG. 4, 400; FIGS. 9, 900) comprises a processor system (FIGS. 9, 902) and a memory (FIGS. 9, 904, 908, 910) that stores computer-executable instructions. The computer-executable instructions are executable by the processor system to at least detect (FIGS. 3, 302) that an electronic device (FIGS. 1, 106; FIG. 2, 224A-224M; FIGS. 6, 600; FIGS. 9, 900) is in a non-operational state. The computer-executable instructions are executable by the processor system further to at least generate (FIGS. 3, 304) a power supply control signal (FIGS. 1, 116; FIGS. 2, 216; FIGS. 4, 416), which is configured to control timing of on states and off states of a power supply (FIGS. 1, 104; FIGS. 2, 204) associated with the electronic device in a manner that results in a plurality of power pulses having a plurality of respective durations. The computer-executable instructions are executable by the processor system further to at least cause (FIGS. 3, 306) the electronic device to initiate a recovery process, which changes the electronic device from the non-operational state to an operational state, using a power reset pattern (FIGS. 1, 118; FIGS. 2, 218; FIGS. 6, 618; FIGS. 8, 818), which is defined by the plurality of power pulses having the plurality of respective durations, by providing the power supply control signal to the power supply via a power line (FIGS. 1, 112; FIGS. 2, 212; FIGS. 4, 412).

(A2) In the example computing system of A1, wherein the computer-executable instructions are executable by the processor system to at least: detect that the electronic device is in the non-operational state by detecting that the electronic device is unable to communicate with the computing system via a communication channel between the computing system and the electronic device; and cause the electronic device to be capable of communicating with the computing system via the communication channel by causing the electronic device to initiate the recovery process.

(A3) In the example computing system of any of A1-A2, wherein the computer-executable instructions are executable by the processor system to at least: detect that logic that is stored in a non-volatile memory of the electronic device is in the non-operational state; and change the logic that is stored in the non-volatile memory of the electronic device from the non-operational state to the operational state by causing the electronic device to initiate the recovery process.

(A4) In the example computing system of any of A1-A3, wherein the computer-executable instructions are executable by the processor system to at least: detect that code that is stored in a mutable, non-volatile memory of the electronic device is in the non-operational state; and change the code that is stored in the mutable, non-volatile memory of the electronic device from the non-operational state to the operational state by causing the electronic device to initiate the recovery process.

(A5) In the example computing system of any of A1-A4, wherein the computer-executable instructions are executable by the processor system to at least: detect that a current version of code that is stored in the non-volatile memory of the electronic device is in the non-operational state; and cause the current version of the code that is stored in the non-volatile memory of the electronic device to be replaced with a previous version of the code that precedes the current version by causing the electronic device to initiate the recovery process.

(A6) In the example computing system of any of A1-A5, wherein the computer-executable instructions are executable by the processor system to at least: detect that a configuration setting of the electronic device causes the electronic device to be in the non-operational state; and change the configuration setting of the electronic device, which causes the electronic device to be changed from the non-operational state to the operational state, by causing the electronic device to initiate the recovery process.

(A7) In the example computing system of any of A1-A6, wherein the computer-executable instructions are executable by the processor system to at least: detect that a hardware component in the electronic device is in the non-operational state; and change the hardware component in the electronic device from the non-operational state to the operational state by causing the electronic device to initiate the recovery process.

(A8) In the example computing system of any of A1-A7, wherein the plurality of respective durations of the plurality of power pulses define an encoded sequence of values that is configured to trigger initiation of the recovery process.

(A9) In the example computing system of any of A1-A8, wherein the computer-executable instructions are executable by the processor system to at least: trigger the power supply to perform a sequence of power resets on the electronic device using the power reset pattern by providing the power supply control signal to the power supply via the power line, wherein a power reset in the sequence is initiated by a corresponding on state of the power supply and is terminated by a corresponding off state of the power supply.

(A10) In the example computing system of any of A1-A9, wherein the power reset pattern is a device-specific power reset pattern that is configured to limit initiation of the recovery process to the electronic device.

(A11) In the example computing system of any of A1-A10, wherein the power supply is associated with a plurality of electronic devices, which comprises the electronic device; and wherein the computer-executable instructions are executable by the processor system to at least: cause the plurality of electronic devices to initiate the recovery process, which changes the plurality of electronic devices from the non-operational state to the operational state, using the power reset pattern, which is defined by the plurality of power pulses having the plurality of respective durations, by providing the power supply control signal to the power supply via the power line.

(A12) In the example computing system of any of A1-A11, wherein the power reset pattern is a device-type power reset pattern that is configured to limit initiation of the recovery process to a specified device type; and wherein the computer-executable instructions are executable by the processor system to at least: cause the plurality of electronic devices to initiate the recovery process using the power reset pattern as a result of the plurality of electronic devices being the specified device type.

(A13) In the example computing system of any of A1-A12, wherein the computer-executable instructions are executable by the processor system to at least: select the power supply control signal from a plurality of power supply control signals, which are configured to trigger the power supply to perform a plurality of respective recovery processes, as a result of an attribute of the electronic device satisfying a recovery criterion; and in response to the power supply control signal being selected from the plurality of power supply control signals, provide the power supply control signal, rather than another power supply control signal from the plurality of power supply control signals, to the power supply via the power line.

(B1) An example electronic device (FIGS. 1, 106; FIG. 2, 224A-224M; FIGS. 6, 600; FIGS. 9, 900) comprises a processor system (FIGS. 9, 902) and a memory (FIGS. 9, 904, 908, 910) that stores computer-executable instructions. The computer-executable instructions are executable by the processor system to at least receive (FIGS. 5, 502) a power reset pattern (FIGS. 1, 118; FIGS. 2, 218; FIGS. 6, 618; FIGS. 8, 818) via a power line (FIGS. 1, 114; FIGS. 2, 214; FIGS. 6, 614) from a power supply (FIGS. 1, 104; FIGS. 2, 204) associated with the electronic device. The power reset pattern is defined by a plurality of power pulses having a plurality of respective durations. The computer-executable instructions are executable by the processor system further to at least determine (FIGS. 5, 504) that the power reset pattern is an instruction to initiate a recovery process. The recovery process is configured to change the electronic device from a non-operational state to an operational state. The computer-executable instructions are executable by the processor system further to at least, in response to a determination that the power reset pattern is the instruction to initiate the recovery process, change (FIGS. 5, 506) the electronic device from the non-operational state to the operational state by initiating the recovery process.

(B2) In the example electronic device of B1, wherein the recovery process is configured to cause the electronic device to be capable of communicating with a computing system via a communication channel; and wherein the computer-executable instructions are executable by the processor system to at least: change the electronic device from the non-operational state in which the electronic device is unable to communicate with the computing system via the communication channel to the operational state in which the electronic device is capable of communicating with the computing system via the communication channel.

(B3) In the example electronic device of any of B1-B2, wherein the recovery process is configured to change logic that is stored in a non-volatile memory of the electronic device from the non-operational state to the operational state; and wherein the computer-executable instructions are executable by the processor system to at least: change the electronic device from the non-operational state to the operational state by changing the logic that is stored in the non-volatile memory of the electronic device from the non-operational state to the operational state.

(B4) In the example electronic device of any of B1-B3, wherein the recovery process is configured to change code that is stored in a mutable, non-volatile memory of the electronic device from the non-operational state to the operational state; and wherein the computer-executable instructions are executable by the processor system to at least: change the electronic device from the non-operational state to the operational state by changing the code that is stored in the mutable, non-volatile memory of the electronic device from the non-operational state to the operational state.

(B5) In the example electronic device of any of B1-B4, wherein the recovery process is configured to replace a current version of code that is stored in the non-volatile memory of the electronic device with a previous version of the code that precedes the current version, wherein the current version of the code is in the non-operational state, wherein the previous version of the code is in the operational state; and wherein the computer-executable instructions are executable by the processor system to at least:

change the electronic device from the non-operational state to the operational state by replacing the current version of the code that is stored in the non-volatile memory of the electronic device with the previous version of the code that precedes the current version.

(B6) In the example electronic device of any of B1-B5, wherein the recovery process is configured to cause a configuration setting of the electronic device to be changed from a value to an other value; and wherein the computer-executable instructions are executable by the processor system to at least: change the configuration setting of the electronic device from the value to the other value, which causes the electronic device to be changed from the non-operational state to the operational state.

(B7) In the example electronic device of any of B1-B6, wherein the recovery process is configured to change a hardware component in the electronic device from the non-operational state to the operational state; and wherein the computer-executable instructions are executable by the processor system to at least: change the electronic device from the non-operational state to the operational state by changing the hardware component in the electronic device from the non-operational state to the operational state.

(B8) In the example electronic device of any of B1-B7, wherein the plurality of respective durations of the plurality of power pulses define an encoded sequence of values that is configured to trigger initiation of the recovery process; and wherein the computer-executable instructions are executable by the processor system to at least: determine that the power reset pattern is the instruction to initiate the recovery process as a result of the plurality of respective durations of the plurality of power pulses defining the encoded sequence of values that is configured to trigger initiation of the recovery process.

(B9) In the example electronic device of any of B1-B8, wherein the computer-executable instructions are executable by the processor system to at least: trigger a sequence of power resets of the electronic device by receiving the power reset pattern, wherein a power reset in the sequence is initiated by a corresponding on state of the power supply and is terminated by a corresponding off state of the power supply.

(B10) In the example electronic device of any of B1-B9, wherein the power reset pattern is a device-specific power reset pattern that is configured to limit performance of the sequence of power resets to the electronic device.

(B11) In the example electronic device of any of B10, wherein the power reset pattern is a device-type power reset pattern that is configured to limit performance of the sequence of power resets to a plurality of electronic devices of a specified device type; and wherein the computer-executable instructions are executable by the processor system to at least: trigger the sequence of power resets of the electronic device as a result of the electronic device being comprised in the plurality of electronic devices of the specified device type.

(B12) In the example electronic device of any of B11, wherein the computer-executable instructions are executable by the processor system to determine that the power reset pattern is the instruction to initiate the recovery process by performing at least the following operations: determine a plurality of counts by counting the plurality of respective durations of the plurality of power pulses that define the power reset pattern; store the plurality of counts in non-volatile memory of the electronic device; and determine that the plurality of counts correspond to a plurality of reference counts that define the instruction.

(C1) A first example method is implemented by a computing system (FIG. 1, 102A-102M, 106A-106N; FIGS. 5, 500; FIGS. 6, 602; FIGS. 7, 700). The method comprises detecting (FIGS. 3, 302) that an electronic device (FIGS. 1, 106; FIG. 2, 224A-224M; FIGS. 6, 600; FIGS. 9, 900) is in a non-operational state. The method further comprises generating (FIGS. 3, 304) a power supply control signal (FIGS. 1, 116; FIGS. 2, 216; FIGS. 4, 416), which is configured to control timing of on states and off states of a power supply (FIGS. 1, 104; FIGS. 2, 204) associated with the electronic device in a manner that results in a plurality of power pulses having a plurality of respective durations. The method further comprises causing (FIGS. 3, 306) the electronic device to initiate a recovery process, which changes the electronic device from the non-operational state to an operational state, using a power reset pattern (FIGS. 1, 118; FIGS. 2, 218; FIGS. 6, 618; FIGS. 8, 818), which is defined by the plurality of power pulses having the plurality of respective durations, by providing the power supply control signal to the power supply via a power line (FIGS. 1, 112; FIGS. 2, 212; FIGS. 4, 412).

(C2) In the example method of C1, wherein detecting that the electronic device is in the non-operational state comprises: detecting that the electronic device is unable to communicate with the computing system via a communication channel between the computing system and the electronic device; and wherein causing the electronic device to initiate the recovery process causes the electronic device to be capable of communicating with the computing system via the communication channel.

(C3) In the example method of any of C1-C2, wherein detecting that the electronic device is in the non-operational state comprises: detecting that logic that is stored in a non-volatile memory of the electronic device is in the non-operational state; and wherein causing the electronic device to initiate the recovery process changes the logic that is stored in the non-volatile memory of the electronic device from the non-operational state to the operational state.

(C4) In the example method of any of C1-C3, wherein detecting that logic is in the non-operational state comprises: detecting that code that is stored in a mutable, non-volatile memory of the electronic device is in the non-operational state; and wherein causing the electronic device to initiate the recovery process changes the code that is stored in the mutable, non-volatile memory of the electronic device from the non-operational state to the operational state.

(C5) In the example method of any of C1-C4, wherein detecting that logic is in the non-operational state comprises: detecting that a current version of code that is stored in the non-volatile memory of the electronic device is in the non-operational state; and wherein causing the electronic device to initiate the recovery process causes the current version of the code that is stored in the non-volatile memory of the electronic device to be replaced with a previous version of the code that precedes the current version.

(C6) In the example method of any of C1-C5, wherein detecting that the electronic device is in the non-operational state comprises: detecting that a configuration setting of the electronic device causes the electronic device to be in the non-operational state; and wherein causing the electronic device to initiate the recovery process changes the configuration setting of the electronic device, which causes the electronic device to be changed from the non-operational state to the operational state.

(C7) In the example method of any of C1-C6, wherein detecting that the electronic device is in the non-operational state comprises: detecting that a hardware component in the electronic device is in the non-operational state; and wherein causing the electronic device to initiate the recovery process changes the hardware component in the electronic device from the non-operational state to the operational state.

(C8) In the example method of any of C1-C7, wherein the plurality of respective durations of the plurality of power pulses define an encoded sequence of values that is configured to trigger initiation of the recovery process.

(C9) In the example method of any of C1-C8, wherein providing the power supply control signal to the power supply via the power line comprises: triggering the power supply to perform a sequence of power resets on the electronic device using the power reset pattern, wherein a power reset in the sequence is initiated by a corresponding on state of the power supply and is terminated by a corresponding off state of the power supply.

(C10) In the example method of any of C1-C9, wherein the power reset pattern is a device-specific power reset pattern that is configured to limit initiation of the recovery process to the electronic device.

(C11) In the example method of any of C1-C10, wherein the power supply is associated with a plurality of electronic devices, which comprises the electronic device; and wherein causing the electronic device to initiate the recovery process comprises: causing the plurality of electronic devices to initiate the recovery process, which changes the plurality of electronic devices from the non-operational state to the operational state, using the power reset pattern, which is defined by the plurality of power pulses having the plurality of respective durations, by providing the power supply control signal to the power supply via the power line.

(C12) In the example method of any of C1-C11, wherein the power reset pattern is a device-type power reset pattern that is configured to limit initiation of the recovery process to a specified device type; and wherein the plurality of electronic devices are caused to initiate the recovery process using the power reset pattern as a result of the plurality of electronic devices being the specified device type.

(C13) In the example method of any of C1-C12, wherein generating the power supply control signal comprises: selecting the power supply control signal from a plurality of power supply control signals, which are configured to trigger the power supply to perform a plurality of respective recovery processes, as a result of an attribute of the electronic device satisfying a recovery criterion; and wherein causing the electronic device to initiate the recovery process comprises: in response to selecting the power supply control signal from the plurality of power supply control signals, providing the power supply control signal, rather than another power supply control signal from the plurality of power supply control signals, to the power supply via the power line.

(D1) A second example method is implemented by an electronic device (FIGS. 1, 106; FIG. 2, 224A-224M; FIGS. 6, 600; FIGS. 9, 900). The method comprises receiving (FIGS. 5, 502) a power reset pattern (FIGS. 1, 118; FIGS. 2, 218; FIGS. 6, 618; FIGS. 8, 818) via a power line (FIGS. 1, 114; FIGS. 2, 214; FIGS. 6, 614) from a power supply (FIGS. 1, 104; FIGS. 2, 204) associated with the electronic device. The power reset pattern is defined by a plurality of power pulses having a plurality of respective durations. The method further comprises determining (FIGS. 5, 504) that the power reset pattern is an instruction to initiate a recovery process. The recovery process is configured to change the electronic device from a non-operational state to an operational state. The method further comprises, in response to determining that the power reset pattern is the instruction to initiate the recovery process, changing (FIGS. 5, 506) the electronic device from the non-operational state to the operational state by initiating the recovery process.

(D2) In the example method of D1, wherein the recovery process is configured to cause the electronic device to be capable of communicating with a computing system via a communication channel; and wherein changing the electronic device from the non-operational state to the operational state comprises: changing the electronic device from the non-operational state in which the electronic device is unable to communicate with the computing system via the communication channel to the operational state in which the electronic device is capable of communicating with the computing system via the communication channel.

(D3) In the example method of any of D1-D2, wherein the recovery process is configured to change logic that is stored in a non-volatile memory of the electronic device from the non-operational state to the operational state; and wherein changing the electronic device from the non-operational state to the operational state comprises: changing the logic that is stored in the non-volatile memory of the electronic device from the non-operational state to the operational state.

(D4) In the example method of any of D1-D3, wherein the recovery process is configured to change code that is stored in a mutable, non-volatile memory of the electronic device from the non-operational state to the operational state; and wherein changing the electronic device from the non-operational state to the operational state comprises: changing the code that is stored in the mutable, non-volatile memory of the electronic device from the non-operational state to the operational state.

(D5) In the example method of any of D1-D4, wherein the recovery process is configured to replace a current version of code that is stored in the non-volatile memory of the electronic device with a previous version of the code that precedes the current version, wherein the current version of the code is in the non-operational state, wherein the previous version of the code is in the operational state; and wherein changing the electronic device from the non-operational state to the operational state comprises: replacing the current version of the code that is stored in the non-volatile memory of the electronic device with the previous version of the code that precedes the current version.

(D6) In the example method of any of D1-D5, wherein the recovery process is configured to cause a configuration setting of the electronic device to be changed from a value to an other value; and wherein changing the electronic device from the non-operational state to the operational state comprises: changing the configuration setting of the electronic device from the value to the other value, which causes the electronic device to be changed from the non-operational state to the operational state.

(D7) In the example method of any of D1-D6, wherein the recovery process is configured to change a hardware component in the electronic device from the non-operational state to the operational state; and wherein changing the electronic device from the non-operational state to the operational state comprises: changing the hardware component in the electronic device from the non-operational state to the operational state.

(D8) In the example method of any of D1-D7, wherein the plurality of respective durations of the plurality of power pulses define an encoded sequence of values that is configured to trigger initiation of the recovery process; and wherein determining that the power reset pattern is the instruction to initiate the recovery process comprises: determining that the power reset pattern is the instruction to initiate the recovery process as a result of the plurality of respective durations of the plurality of power pulses defining the encoded sequence of values that is configured to trigger initiation of the recovery process.

(D9) In the example method of any of D1-D8, wherein receiving the power reset pattern comprises: triggering a sequence of power resets of the electronic device, wherein a power reset in the sequence is initiated by a corresponding on state of the power supply and is terminated by a corresponding off state of the power supply.

(D10) In the example method of any of D1-D9, wherein the power reset pattern is a device-specific power reset pattern that is configured to limit performance of the sequence of power resets to the electronic device.

(D11) In the example method of any of D1-D10, wherein the power reset pattern is a device-type power reset pattern that is configured to limit performance of the sequence of power resets to a plurality of electronic devices of a specified device type; and wherein triggering the sequence of power resets of the electronic device comprises: triggering the sequence of power resets of the electronic device as a result of the plurality of electronic devices of the specified device type comprising the electronic device.

(D12) In the example method of any of D1-D11, wherein determining that the power reset pattern is the instruction to initiate the recovery process comprises: determining a plurality of counts by counting the plurality of respective durations of the plurality of power pulses that define the power reset pattern; storing the plurality of counts in non-volatile memory of the electronic device; and determining that the plurality of counts correspond to a plurality of reference counts that define the instruction.

(E1) A first example computer program product (FIGS. 9, 918, 922) comprises a computer-readable storage medium having instructions recorded thereon for enabling a processor-based system (FIGS. 1, 102; FIG. 2, 222A-222N; FIGS. 4, 400; FIGS. 9, 900) to perform operations. The operations comprise detecting (FIGS. 3, 302) that an electronic device (FIGS. 1, 106; FIG. 2, 224A-224M; FIGS. 6, 600; FIGS. 9, 900) is unable to communicate with the computing system via a network. The operations further comprise generating (FIGS. 3, 304) a power supply control signal (FIGS. 1, 116; FIGS. 2, 216; FIGS. 4, 416), which is configured to control timing of on states and off states of a power supply (FIGS. 1, 104; FIGS. 2, 204) associated with the electronic device in a manner that results in a plurality of power pulses having a plurality of respective durations. The operations further comprise causing (FIGS. 3, 306) the electronic device to initiate a recovery process, which enables the electronic device to communicate with the computing system via the network, using a power reset pattern (FIGS. 1, 118; FIGS. 2, 218; FIGS. 6, 618; FIGS. 8, 818), which is defined by the plurality of power pulses having the plurality of respective durations, by providing the power supply control signal to the power supply via a power line (FIGS. 1, 112; FIGS. 2, 212; FIGS. 4, 412).

(F1) A second example computer program product (FIGS. 9, 918, 922) comprises a computer-readable storage medium having instructions recorded thereon for enabling a processor-based system (FIGS. 1, 106; FIG.

2, 224A-224M; FIGS. 6, 600; FIGS. 9, 900) to perform operations. The operations comprise receiving (FIGS. 5, 502) a power reset pattern (FIGS. 1, 118; FIGS. 2, 218; FIGS. 6, 618; FIGS. 8, 818) via a power line (FIGS. 1, 114; FIGS. 2, 214; FIGS. 6, 614) from a power supply (FIGS. 1, 104; FIGS. 2, 204) associated with the processor-based system. The power reset pattern is defined by a plurality of power pulses having a plurality of respective durations. The operations further comprise determining (FIGS. 5, 504) that the power reset pattern is an instruction to initiate a recovery process. The recovery process is configured to change the processor-based system from a non-operational state in which the processor-based system is unable to communicate with a computing system via a network to an operational state in which the processor-based system is able to communicate with the computing system via the network. The operations further comprise, in response to determining that the power reset pattern is the instruction to initiate the recovery process, changing (FIGS. 5, 506) the processor-based system from the non-operational state to the operational state, which enables the processor-based system to communicate with the computing system via the network.

III. Example Computer System

FIG. 9 depicts an example computer 900 in which embodiments may be implemented. Any one or more of the computing system 102 and/or the electronic device 106 shown in FIG. 1, any one or more of the servers 222A-222N and/or any one or more of the client devices 224A-224M shown in FIG. 2, the computing system 400 shown in FIG. 4, and/or the electronic device 600 shown in FIG. 6 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processor system 902, a system memory 904, and a bus 906 that couples various system components including system memory 904 to processor system 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the power-controlling recovery logic 108, the power-based recovery logic 110, the power-controlling recovery logic 208, the power-based recovery logic 210, the power-controlling recovery logic 408, the state detection logic 432, the signal generation logic 434, the power supply control logic 436, the power-based recovery logic 610, the instruction determination logic 642, the recovery initiation logic 644, the instruction determination logic 800, the count logic 852, the correspondence determination logic 854, flowchart 300 (including any step of flowchart 300), flowchart 500 (including any step of flowchart 500), and/or flowchart 700 (including any step of flowchart 700), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processor system 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An electronic device comprising:

a processor system; and a memory that stores computer-executable instructions that are executable by the processor system to at least:

receive a power reset pattern via a power line from a power supply associated with the electronic device, the power reset pattern defined by a plurality of power pulses having a plurality of respective durations;

determine that the power reset pattern is an instruction to initiate a recovery process, wherein the recovery process is configured to change the electronic device from a non-operational state to an operational state; and in response to a determination that the power reset pattern is the instruction to initiate the recovery process, change the electronic device from the non-operational state to the operational state by initiating the recovery process.

2. The electronic device of claim 1, wherein the recovery process is configured to cause the electronic device to be capable of communicating with a computing system via a communication channel; and wherein the computer-executable instructions are executable by the processor system to at least:

change the electronic device from the non-operational state in which the electronic device is unable to communicate with the computing system via the communication channel to the operational state in which the electronic device is capable of communicating with the computing system via the communication channel.

3. The electronic device of claim 1, wherein the recovery process is configured to change logic that is stored in a non-volatile memory of the electronic device from the non-operational state to the operational state; and wherein the computer-executable instructions are executable by the processor system to at least:

change the electronic device from the non-operational state to the operational state by changing the logic that is stored in the non-volatile memory of the electronic device from the non-operational state to the operational state.

4. The electronic device of claim 3, wherein the recovery process is configured to change code that is stored in a mutable, non-volatile memory of the electronic device from the non-operational state to the operational state; and wherein the computer-executable instructions are executable by the processor system to at least:

change the electronic device from the non-operational state to the operational state by changing the code that is stored in the mutable, non-volatile memory of the electronic device from the non-operational state to the operational state.

5. The electronic device of claim 3, wherein the recovery process is configured to replace a current version of code that is stored in the non-volatile memory of the electronic device with a previous version of the code that precedes the current version, wherein the current version of the code is in the non-operational state, wherein the previous version of the code is in the operational state; and wherein the computer-executable instructions are executable by the processor system to at least:

change the electronic device from the non-operational state to the operational state by replacing the current version of the code that is stored in the non-volatile memory of the electronic device with the previous version of the code that precedes the current version.

6. The electronic device of claim 1, wherein the recovery process is configured to cause a configuration setting of the electronic device to be changed from a value to an other value; and wherein the computer-executable instructions are executable by the processor system to at least:

change the configuration setting of the electronic device from the value to the other value, which causes the electronic device to be changed from the non-operational state to the operational state.

7. The electronic device of claim 1, wherein the recovery process is configured to change a hardware component in the electronic device from the non-operational state to the operational state; and wherein the computer-executable instructions are executable by the processor system to at least:

change the electronic device from the non-operational state to the operational state by changing the hardware component in the electronic device from the non-operational state to the operational state.

8. The electronic device of claim 1, wherein the plurality of respective durations of the plurality of power pulses define an encoded sequence of values that is configured to trigger initiation of the recovery process; and wherein the computer-executable instructions are executable by the processor system to at least:

determine that the power reset pattern is the instruction to initiate the recovery process as a result of the plurality of respective durations of the plurality of power pulses defining the encoded sequence of values that is configured to trigger initiation of the recovery process.

9. The electronic device of claim 1, wherein the computer-executable instructions are executable by the processor system to at least:

trigger a sequence of power resets of the electronic device by receiving the power reset pattern, wherein a power reset in the sequence is initiated by a corresponding on state of the power supply and is terminated by a corresponding off state of the power supply.

10. The electronic device of claim 1, wherein the computer-executable instructions are executable by the processor system to determine that the power reset pattern is the instruction to initiate the recovery process by performing at least the following operations:

determine a plurality of counts by counting the plurality of respective durations of the plurality of power pulses that define the power reset pattern;

store the plurality of counts in non-volatile memory of the electronic device; and determine that the plurality of counts correspond to a plurality of reference counts that define the instruction.

11. A method implemented by a computing system, the method comprising:

detecting that an electronic device is in a non-operational state;

generating a power supply control signal, which is configured to control timing of on states and off states of a power supply associated with the electronic device in a manner that results in a plurality of power pulses having a plurality of respective durations; and causing the electronic device to initiate a recovery process, which changes the electronic device from the non-operational state to an operational state, using a power reset pattern, which is defined by the plurality of power pulses having the plurality of respective durations, by providing the power supply control signal to the power supply via a power line.

12. The method of claim 11, wherein detecting that the electronic device is in the non-operational state comprises:

detecting that logic that is stored in a non-volatile memory of the electronic device is in the non-operational state; and wherein causing the electronic device to initiate the recovery process changes the logic that is stored in the non-volatile memory of the electronic device from the non-operational state to the operational state.

13. The method of claim 11, wherein detecting that the electronic device is in the non-operational state comprises:

detecting that a configuration setting of the electronic device causes the electronic device to be in the non-operational state; and wherein causing the electronic device to initiate the recovery process changes the configuration setting of the electronic device, which causes the electronic device to be changed from the non-operational state to the operational state.

14. The method of claim 11, wherein detecting that the electronic device is in the non-operational state comprises:

detecting that a hardware component in the electronic device is in the non-operational state; and wherein causing the electronic device to initiate the recovery process changes the hardware component in the electronic device from the non-operational state to the operational state.

15. The method of claim 11, wherein the plurality of respective durations of the plurality of power pulses define an encoded sequence of values that is configured to trigger initiation of the recovery process.

16. The method of claim 11, wherein the power reset pattern is a device-specific power reset pattern that is configured to limit initiation of the recovery process to the electronic device.

17. The method of claim 11, wherein the power supply is associated with a plurality of electronic devices, which comprises the electronic device; and wherein causing the electronic device to initiate the recovery process comprises:

causing the plurality of electronic devices to initiate the recovery process, which changes the plurality of electronic devices from the non-operational state to the operational state, using the power reset pattern, which is defined by the plurality of power pulses having the plurality of respective durations, by providing the power supply control signal to the power supply via the power line.

18. The method of claim 11, wherein the power reset pattern is a device-type power reset pattern that is configured to limit initiation of the recovery process to a specified device type; and wherein the plurality of electronic devices are caused to initiate the recovery process using the power reset pattern as a result of the plurality of electronic devices being the specified device type.

19. The method of claim 11, wherein generating the power supply control signal comprises:

selecting the power supply control signal from a plurality of power supply control signals, which are configured to trigger the power supply to perform a plurality of respective recovery processes, as a result of an attribute of the electronic device satisfying a recovery criterion; and wherein causing the electronic device to initiate the recovery process comprises:

in response to selecting the power supply control signal from the plurality of power supply control signals, providing the power supply control signal, rather than another power supply control signal from the plurality of power supply control signals, to the power supply via the power line.

20. A computer program product comprising a computer-readable storage medium having instructions recorded thereon for enabling a processor-based system to perform operations, the operations comprising:

detecting that an electronic device is unable to communicate with the computing system via a network;

generating a power supply control signal, which is configured to control timing of on states and off states of a power supply associated with the electronic device in a manner that results in a plurality of power pulses having a plurality of respective durations; and causing the electronic device to initiate a recovery process, which enables the electronic device to communicate with the computing system via the network, using a power reset pattern, which is defined by the plurality of power pulses having the plurality of respective durations, by providing the power supply control signal to the power supply via a power line.

* * * * *